(12) United States Patent
Kanno

(10) Patent No.: US 11,831,821 B2
(45) Date of Patent: Nov. 28, 2023

(54) INFORMATION PROCESSING APPARATUS CAPABLE OF RESPONDING TO IMAGE TRANSMISSION REQUEST ISSUED BEFORE IMAGE ACCUMULATION, METHOD OF CONTROLLING SAME, IMAGE PROCESSING SYSTEM, AND STORAGE MEDIUM

(71) Applicant: CANON KABUSHIKI KAISHA, Tokyo (JP)

(72) Inventor: Shoichi Kanno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/880,736

(22) Filed: Aug. 4, 2022

(65) Prior Publication Data
US 2023/0066538 A1 Mar. 2, 2023

(30) Foreign Application Priority Data
Aug. 26, 2021 (JP) .................................. 2021-138071

(51) Int. Cl.
*H04N 1/00* (2006.01)

(52) U.S. Cl.
CPC ..... *H04N 1/00228* (2013.01); *H04N 1/00042* (2013.01)

(58) Field of Classification Search
None
See application file for complete search history.

(56) References Cited

U.S. PATENT DOCUMENTS

| 6,550,680 B1* | 4/2003 | Kolis | G06K 7/10851 235/462.15 |
| 6,636,325 B1* | 10/2003 | Kurase | G06K 15/00 358/1.14 |
| 2004/0051912 A1* | 3/2004 | Schlank | H04N 1/00472 358/1.15 |
| 2009/0190163 A1* | 7/2009 | Sato | H04N 1/4426 358/1.15 |
| 2009/0225349 A1* | 9/2009 | Hirai | H04N 1/00938 358/1.15 |

(Continued)

FOREIGN PATENT DOCUMENTS

| JP | H1155445 | * 2/1999 | ............... H04N 1/00 |
| JP | 3897369 | * 3/2007 | ............... H04N 1/00 |

(Continued)

*Primary Examiner* — Beniyam Menberu
(74) *Attorney, Agent, or Firm* — ROSSI, KIMMS & McDOWELL LLP

(57) ABSTRACT

An information processing apparatus capable of performing reception of an image in response to a transmission request issued before image accumulation while suppressing power consumption. The information processing apparatus transmits a request for transmitting an image to an image processing apparatus and monitors whether or not an image associated with the transmission request has been received. In response to receiving information indicating that there is no image associated with the transmission request, as a response to the transmission request, monitoring of whether or not an image associated with the transmission request has been received is started.

13 Claims, 23 Drawing Sheets

(56) References Cited

U.S. PATENT DOCUMENTS

| | | | | |
|---|---|---|---|---|
| 2010/0235772 A1* | 9/2010 | Ikeura | ................... | G06F 3/1225 |
| | | | | 715/771 |
| 2013/0268624 A1* | 10/2013 | Yagiura | ................... | H04L 67/10 |
| | | | | 709/217 |
| 2015/0201091 A1* | 7/2015 | Yokoyama | ......... | H04N 1/00106 |
| | | | | 358/1.15 |
| 2018/0159990 A1* | 6/2018 | Hasegawa | .......... | H04N 1/32776 |
| 2019/0102333 A1* | 4/2019 | Hundal | ............... | G06F 13/1673 |
| 2021/0306475 A1* | 9/2021 | Ishida | ..................... | H04L 43/16 |

FOREIGN PATENT DOCUMENTS

| | | | | | |
|---|---|---|---|---|---|
| JP | 2007129737 | A | | 5/2007 | |
| JP | 2010205070 | | * | 9/2010 | ............. G06F 13/00 |
| JP | 2011232949 | | * | 11/2011 | ......... H04N 1/00241 |
| JP | 2012182744 | | * | 9/2012 | ............... H04N 1/00 |
| JP | 2018019229 | | * | 2/2018 | ............... H04N 1/00 |
| KR | 20070044134 | | * | 4/2007 | ........... H04L 67/104 |
| WO | WO 00/70535 | | * | 11/2000 | ............... G06F 3/00 |

\* cited by examiner

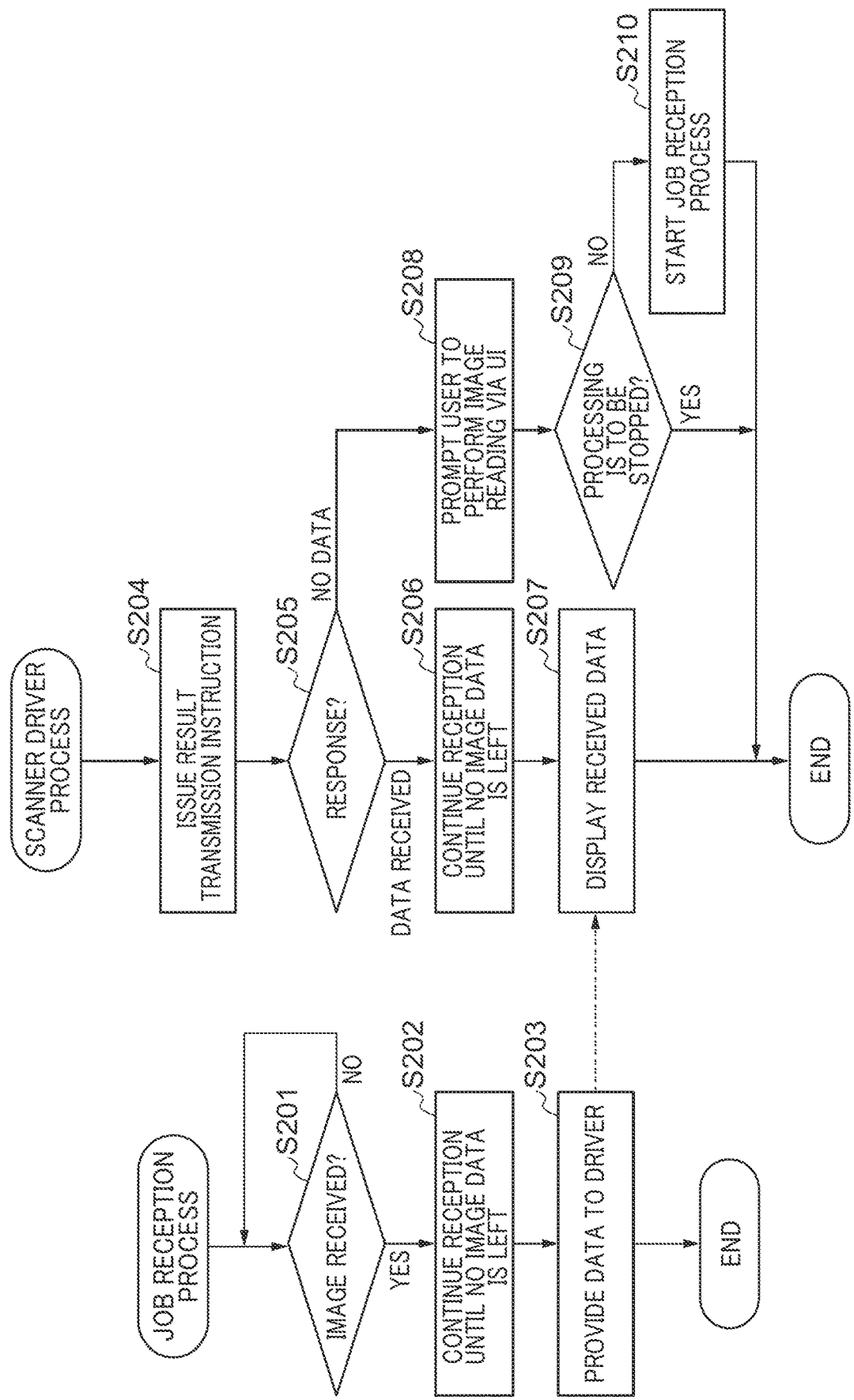

| INFORMATION PROCESSING APPARATUS → IMAGE PROCESSING APPARATUS |

```
POST /hoge/PCIInfo HTTP/1.1
Host: 100.110.120.130
Content-Type: text/xml
<scan:ScanSettings>
   <scan:Intent>SettingInfo</scan:Intent>
   <scan:ScanDestinations>
       <xyz:DestinationUri>https://100.110.120.210/ScanData/20201010<xyz:DestinationUri>
       <xyz:JobOriginatingUserName>YamadaTaro</xyz:JobOriginatingUserName>
       <xyz:JobOriginatingPCName>Soumu01</xyz:JobOriginatingPCName>
   </scan:ScanDestinations>
</scan:ScanSettings>
```

| INFORMATION PROCESSING APPARATUS → IMAGE PROCESSING APPARATUS |

```
<?xml version="1.0" encoding="UTF-8"?>
<scan:ScanSettings>
   <pwg:ScanRegions>
       <pwg:ScanRegion>
           <pwg:Height>any</pwg:Height>
           <pwg:Width>any</pwg:Width>
           <pwg:XOffset>any</pwg:XOffset>
           <pwg:YOffset>any</pwg:YOffset>
       </pwg:ScanRegion>
       <pwg:ScanOwner>
           <pwg:PCName>Soumu01</pwg:PCName>
           <pwg:UserName>YamadaTato</pwg:UserName>
       </pwg:ScanOwner>
   </pwg:ScanRegions>
   <pwg:InputSource>Box</pwg:InputSource>
   <pwg:DocumentFormat>any</pwg:DocumentFormat>
   <scan:Intent>Document</scan:Intent>
</scan:ScanSettings>
```

| INFORMATION PROCESSING APPARATUS ← IMAGE PROCESSING APPARATUS |

HTTP/1.1 200 OK

| INFORMATION PROCESSING APPARATUS ← IMAGE PROCESSING APPARATUS |

POST /100.110.120.210 HTTP/1.1
Host: 100.110.120.210/ScnData/20201010
Authntication: Basic XYZXYZXYZ
Content-Type: image/jpeg
Content-Length: 12000
[[ binary data ]]

| INFORMATION PROCESSING APPARATUS ← IMAGE PROCESSING APPARATUS |

HTTP/1.1 204 No Content

| INFORMATION PROCESSING APPARATUS ← IMAGE PROCESSING APPARATUS |

HTTP/1.1 200 OK

| INFORMATION PROCESSING APPARATUS → IMAGE PROCESSING APPARATUS |

POST /hoge/PCIInfo HTTP/1.1
Host: 100.110.120.130
Content-Type: text/xml
<scan:ScanSettings>
   <scan:Intent>RemoveInfo</scan:Intent>
   <scan:ScanDestinations>
      <xyz:DestinationUri>https://100.110.120.210/ScanData/20201010<xyz:DestinationUri>
      <xyz:JobOriginatingUserName>YamadaTaro</xyz:JobOriginatingUserName>
      <xyz:JobOriginatingPCName>Soumu01</xyz:JobOriginatingPCName>
   </scan:ScanDestinations>
</scan:ScanSettings>

INFORMATION PROCESSING APPARATUS CAPABLE OF RESPONDING TO IMAGE TRANSMISSION REQUEST ISSUED BEFORE IMAGE ACCUMULATION, METHOD OF CONTROLLING SAME, IMAGE PROCESSING SYSTEM, AND STORAGE MEDIUM

BACKGROUND OF THE INVENTION

Field of the Invention

The present invention relates to an information processing apparatus that is capable of responding to an image transmission request issued before image accumulation, a method of controlling the same, an image processing system, and a storage medium.

Description of the Related Art

In general, there are several methods of scanning an image, including pull scan and push scan. The pull scan is a scanning method in which an image is acquired by issuing an image reading instruction from an information processing apparatus to an image processing apparatus. A user sets an original on the image processing apparatus, then returns to the information processing apparatus to input an image reading instruction, thereby causing the image processing apparatus to execute scanning, and then goes to the image processing apparatus again to collect the original. Therefore, the time and effort are required to perform these operations.

The push scan is a method in which an image acquired by an image processing apparatus is transmitted to an information processing apparatus and it is unnecessary for a user to reciprocally move between the information processing apparatus and the image processing apparatus. However, the information processing apparatus is required to cause a reception process for receiving an image transmitted from the image processing apparatus to always operate, and thereby remain on standby such that the information processing apparatus can receive data whenever the push scan is performed. Since the reception process is caused to always operate, the power consumption is increased. Particularly, in a case where the information processing apparatus is a mobile-type terminal driven by a battery, the problem of power consumption becomes large.

Further, the image scanning method includes a method in which, after an image is held (accumulated) in the image processing apparatus, the information processing apparatus takes (receives) the held image (this is referred to as the hold scan). In this method, a user is not required to move from the information processing apparatus to the image processing apparatus and return from the image processing apparatus to the information processing apparatus, nor to cause the reception process to always operate.

However, in the above-mentioned hold scan, in a case where an instruction for transmitting a held image is issued before holding the image, a problem on the operation flow that the image cannot be received is caused. On the other hand, if the reception process is caused to always operate to make it possible to receive the image regardless of the timing of issuing the instruction for transmitting the held image, the power consumption is increased.

In Japanese Laid-Open Patent Publication (Kokai) No. 2007-129737, although an image storage area used for the hold scan is described, a case where an image transmission instruction is issued before holding the image is not considered. Therefore, it is difficult to realize both of suppression of power consumption and reception of an image in response to a transmission request issued before image accumulation.

SUMMARY OF THE INVENTION

The present invention provides an information processing apparatus that is capable of performing reception of an image in response to a transmission request issued before image accumulation while suppressing power consumption, a method of controlling the same, an image processing system, and a storage medium.

In a first aspect of the present invention, there is provided an information processing apparatus including at least one processor, and a memory coupled to the at least one processor, the memory having instructions that, when executed by the processor, perform the operations as: a transmission unit configured to transmit a request for transmitting an image to an image processing apparatus, a monitoring unit configured to monitor whether or not an image associated with the transmission request has been received, and a control unit configured to control the monitoring unit to start monitoring of whether or not an image associated with the transmission request has been received, in response to receiving information indicating that there is no image associated with the transmission request, as a response to the transmission request.

In a second aspect of the present invention, there is provided an image processing system including an information processing apparatus and an image processing apparatus communicably connected to each other, the information processing apparatus including at least one processor, and a memory coupled to the at least one processor, the memory having instructions that, when executed by the processor, perform the operations as: a transmission unit configured to transmit a request for transmitting an image to the image processing apparatus, a monitoring unit configured to monitor whether or not an image associated with the transmission request has been received, and a control unit configured to control the monitoring unit to start monitoring of whether or not an image associated with the transmission request has been received in response to receiving information indicating that there is no image associated with the transmission request, as a response to the transmission request, wherein in a case where there is no image associated with the transmission request, the image processing apparatus transmits the information indicating that there is no image associated with the transmission request to the information processing apparatus.

In a third aspect of the present invention, there is provided a method of controlling an information processing apparatus, including transmitting a request for transmitting an image to an image processing apparatus, monitoring whether or not an image associated with the transmission request has been received, and starting monitoring of whether or not an image associated with the transmission request has been received, in response to receiving information indicating that there is no image associated with the transmission request, as a response to the transmission request.

According to the present invention, it is possible to perform reception of an image in response to a transmission request issued before image accumulation while suppressing power consumption.

Further features of the present invention will become apparent from the following description of exemplary embodiments (with reference to the attached drawings).

BRIEF DESCRIPTION OF THE DRAWINGS

FIGS. 7A and 7B are flowcharts showing a job reception process and a scanner driver process, respectively.

FIGS. 11A to 11G are diagrams each showing an example of data transmitted and received between the information processing apparatus and the image processing apparatus.

DESCRIPTION OF THE EMBODIMENTS

The present invention will now be described in detail below with reference to the accompanying drawings showing embodiments thereof.

Figure 1:
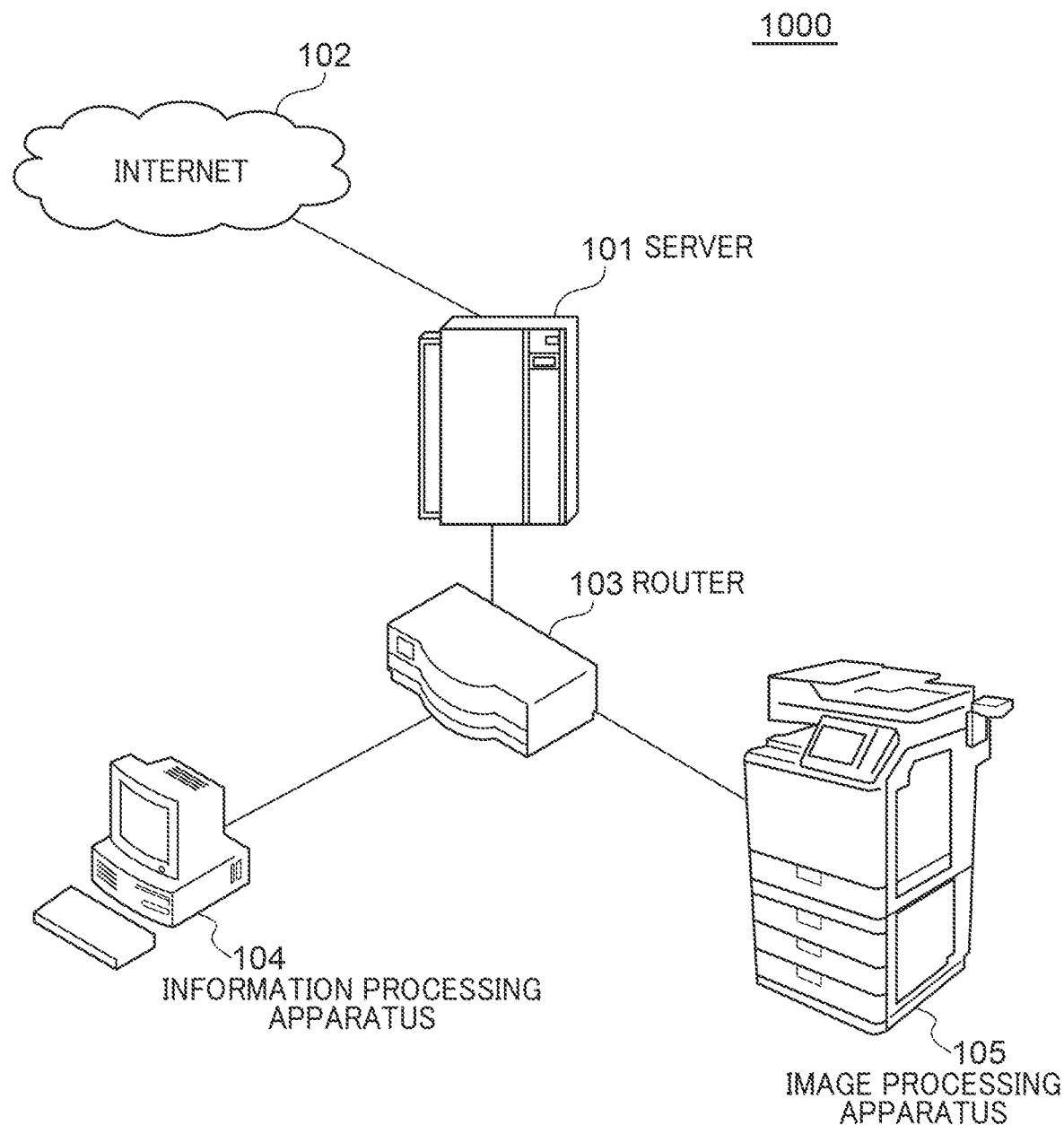
FIG. 1 is a diagram showing the whole configuration of an image processing system.

FIG. 1 is a diagram showing the whole configuration of an image processing system to which an information processing apparatus according to an embodiment of the present invention is applied. This image processing system, denoted by reference numeral 1000, is formed by communicably connecting an information processing apparatus 104, an image processing apparatus 105, and a server 101, to each other, via a router 103. The form of connection between the apparatuses/devices may be wired connection or wireless connection. The server 101 is a server that controls a network (NW) environment within a company, for example. In the present embodiment, it is assumed that the server 101 also has a function of exchanging information between the Internet 102 and a corporate network.

The information processing apparatus 104 participating in the corporate network is enabled to access resources on the Internet 102 via the server 101. On the Internet 102, there are provided, for example, a printer driver distribution site and the like.

In the present embodiment, as the image scan method, there is employed a method in which a scanned image is held (accumulated) in the image processing apparatus 105, and then the information processing apparatus 104 takes (receives) the held image (hereinafter, the method is referred to as the hold scan). The information processing apparatus 104 can transmit (issue) a scan result transmission instruction for a held image accumulated by the hold scan to the image processing apparatus 105. The image processing apparatus 105 can transmit data indicative of a scan result of the held image and a response indicating no accumulation of a held image, to the information processing apparatus 104.

Figure 2:
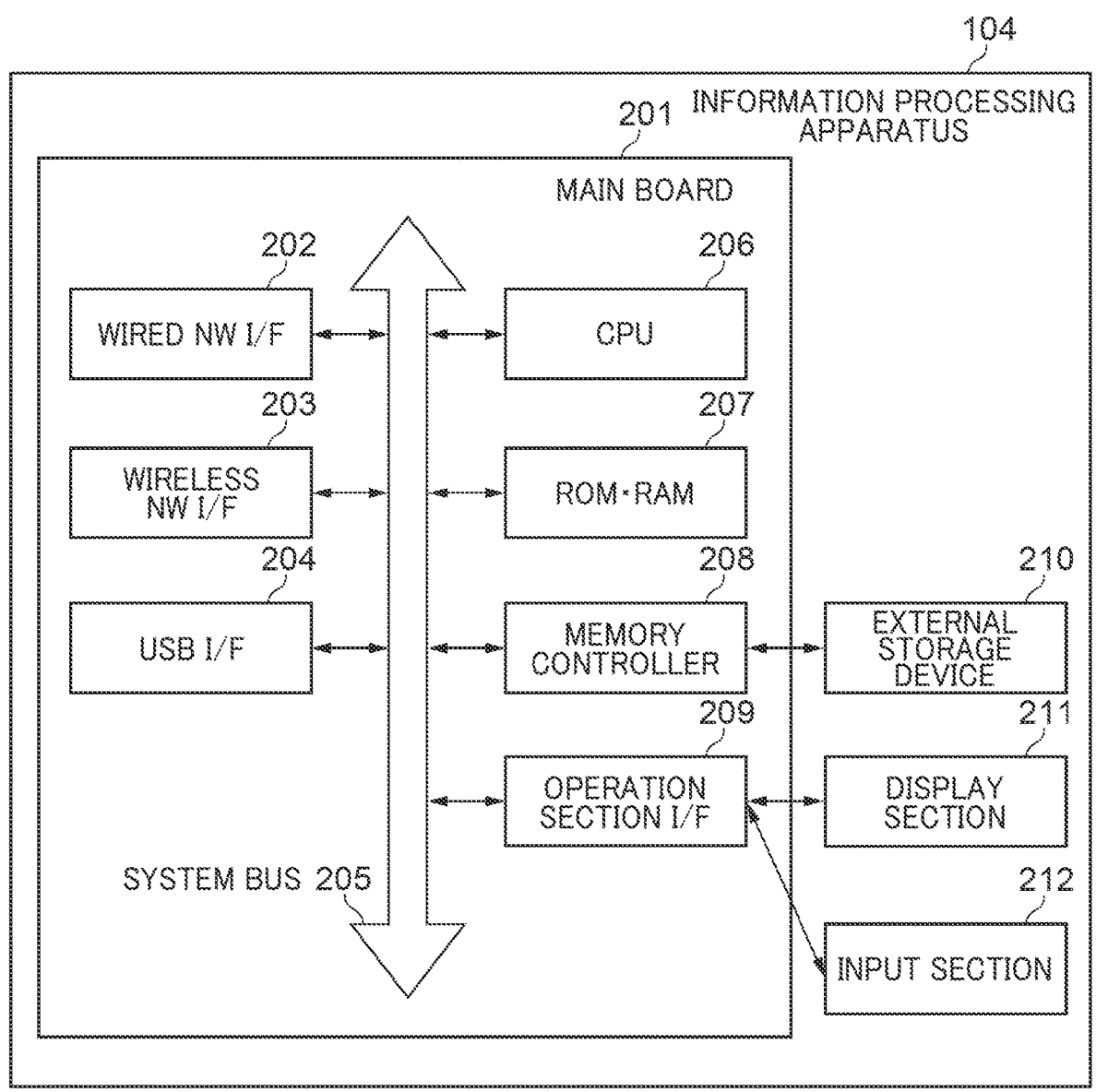
FIG. 2 is a hardware block diagram of an information processing apparatus.

FIG. 2 is a hardware block diagram of the information processing apparatus 104. The information processing apparatus 104 may be a mobile terminal, represented by a smartphone or a tablet, or may be a computer terminal represented by a personal computer (PC). A main board 201 is a control circuit board of the information processing apparatus 104. A wired network interface 202 performs communication control of a communication network represented by the Ethernet. The information processing apparatus 104 can communicate with apparatuses/devices on the corporate network and the Internet 102 via the wired network interface 202.

A wireless network interface 203 mainly controls wireless communication conforming to the IEEE 802.11 series (also referred to as the Wi-Fi (registered trademark) communication). Further, the wireless network interface 203 also functions as an interface for a mobile communication system, such as LTE and 5G. The information processing apparatus 104 can communicate with apparatuses/devices on the corporate network and the Internet 102 via the wireless network interface 203. Further, the information processing apparatus 104 can directly access the Internet 102 via a base station of the mobile communication system. A USB interface 204 connects the information processing apparatus 104 to a peripheral device and the like, which conform to the USB standard. A system bus 205 exchanges information between a variety of processing blocks on the main board 201.

A ROM/RAM 207 stores a start-up program for the information processing apparatus 104 and provides a storage area for operation. A CPU 206 controls the overall operation of the information processing apparatus 104 by executing control programs, such as an operating system and applications, loaded from a ROM to a RAM of the ROM/RAM 207. A memory controller 208 controls transmission and reception of data to and from an external storage device 210. The external storage device 210 is a storage area which plays an auxiliary role for the ROM/RAM 207, and is generally implemented by a hard disk, a USB memory, an optical memory device, or the like. The programs, such as the OS and the applications, temporary data, files, and so forth are stored in the external storage device 210. Thus, the hardware including the CPU 206, the ROM/RAM 207, and the external storage device 210 forms a so-called computer.

Note that although in the present embodiment, the CPU 206, which is single, executes processes shown in flowcharts, referred to hereinafter, another form of execution of the processes may be employed. For example, a plurality of processors, memories, storages, and so forth, may cooperate to execute the processes shown in the flowcharts.

An operation section interface 209 connects between a display section 211 and an input section 212, and the main board 201. The display section 211 is a display device, such as a liquid crystal panel or an organic EL panel, and functions as a display section that presents information to a user. The input section 212 is a device including a keyboard, a mouse, and/or a touch panel disposed on an upper surface of the display section, and receives an operation from the user.

Figure 3:
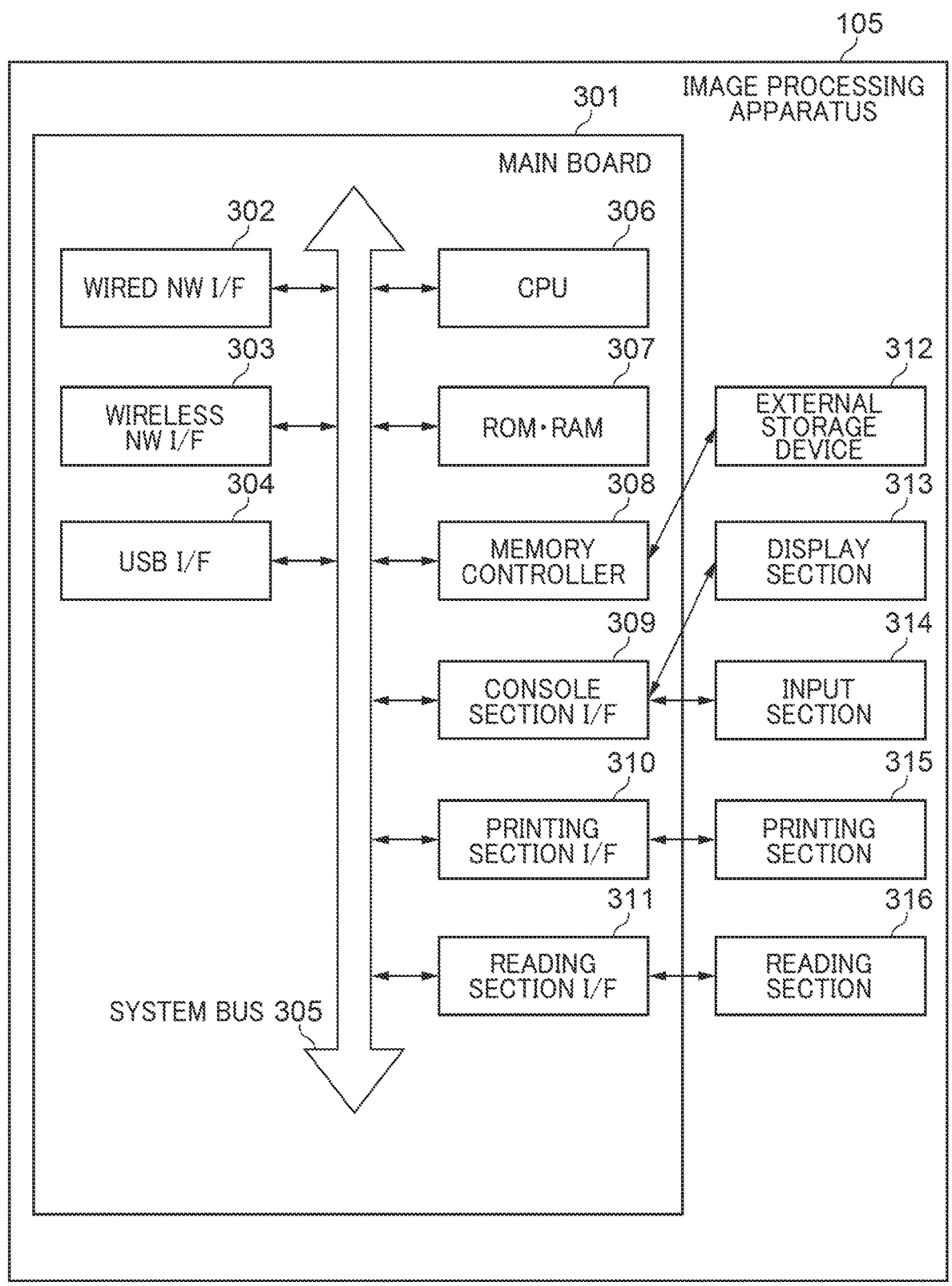
FIG. 3 is a hardware block diagram of an image processing apparatus.

FIG. 3 is a hardware block diagram of the image processing apparatus 105. The image processing apparatus 105 has a function of reading an image in cooperation with the information processing apparatus 104 and providing the read data to the information processing apparatus 104.

A main board 301 is a control circuit board of the image processing apparatus 105. A wired network interface 302 performs communication control of a wired communication network represented by the Ethernet. The image processing apparatus 105 can communicate with apparatuses/devices on the corporate network or the Internet 102 using the wired network interface 302. A wireless network interface 303 mainly controls wireless communication conforming to the IEEE 802.11 series (also referred to as the Wi-Fi (registered trademark) communication). Further, the wireless network interface 303 also functions as an interface for a mobile communication system, such as LTE and 5G. The image processing apparatus 105 can communicate with apparatuses/devices on the corporate network and the Internet 102 via the wireless network interface 303. Further, the image processing apparatus 105 can also directly access the Internet 102 via the base station of the mobile communication system. Which of the wired communication and the wireless communication is to be used to access the Internet 102 can be changed by configuring settings using a display section 313 and an input section 314 which are included in the image processing apparatus 105.

A USB interface 304 connects the image processing apparatus 105 to a terminal device or the like conforming to the USB standard. A system bus 305 exchanges information between a variety of processing blocks on the main board 301. A ROM/RAM 307 stores a start-up program for the image processing apparatus 105 and provides a storage area for operation. A CPU 306 controls the overall operation of the image processing apparatus 105 by executing control programs, such as an operating system and applications, loaded from a ROM to a RAM of the ROM/RAM 307. A memory controller 308 controls transmission and reception of data to and from an external storage device 312. The external storage device 312 is a storage area which plays an auxiliary role for the ROM/RAM 307, and is generally implemented by a hard disk, a USB memory, an optical memory device, or the like. The programs, such as the OS and the applications, temporary data, files, and so forth are stored in the external storage device 312.

A console section interface 309 connects between the display section 313 and the input section 314, and the main board 301. The display section 313 is a display device, such as a liquid crystal panel or an organic EL panel, and functions as a display section that presents information to the user. The input section 314 is a device, such as a keyboard and a touch panel disposed on a display surface, and receives an operation from the user. A printing section interface 310 delivers image data for printing to a printing section 315. A reading section interface 311 receives image data from a reading section 316.

The printing section 315 is a so-called printer engine and can perform printing on a sheet as a recording medium using any of a variety of printing methods, such as an electrophotographic method and an inkjet method. Sheet feed cassettes holding a plurality of types of sheets, a double-sided printing mechanism, a monochrome/color printing mechanism, a stapling mechanism, a bookbinding mechanism, a trimming mechanism, a sheet sorter, and so forth are also included in this printing section 315. The reading section 316 is a so-called scanner and includes an original platen glass and an image sensor. A feeder that automatically feeds originals is also included in this reading section 316.

Figure 4A:
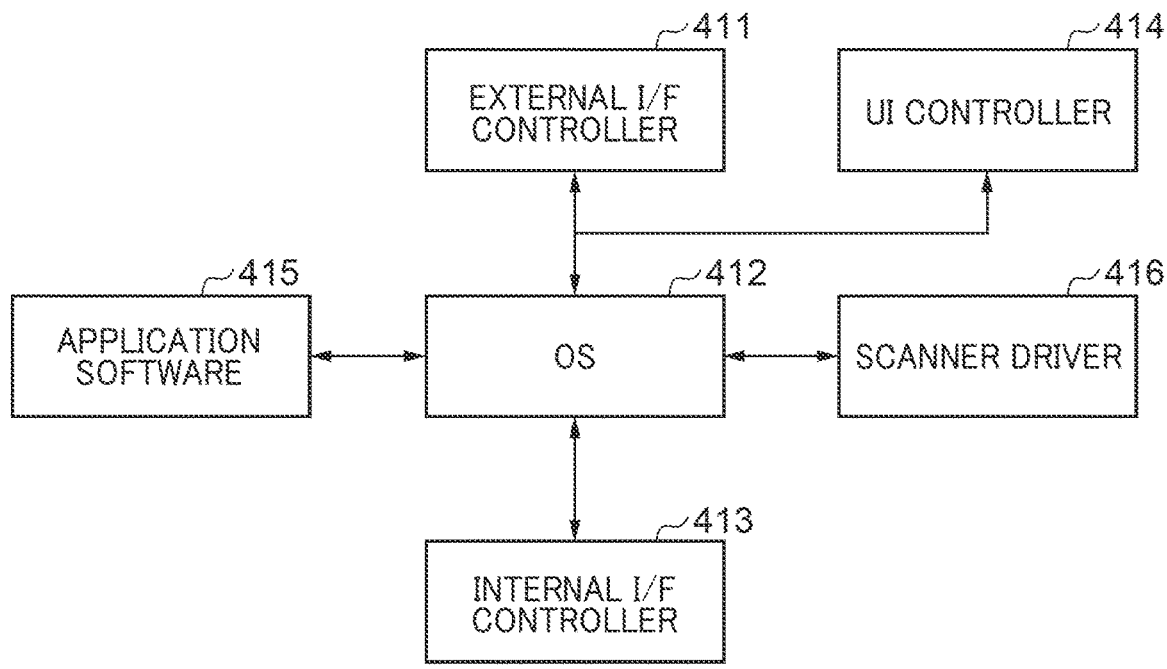
FIGS. 4A to 4C are block diagrams showing software, a scanner driver installer, and a scanner driver of the information processing apparatus, respectively.

FIG. 4A is a software block diagram of the information processing apparatus 104. These software items are mainly stored in the ROM/RAM 207 (see FIG. 2) for operation. The functional sections shown in FIG. 4A are realized by cooperation of the CPU 206, the ROM/RAM 207, and so forth.

An external interface controller 411 shown in FIG. 4A communicates with the server 101 using the wired network interface 202 or the wireless network interface 203 (see FIG. 2). This enables the external interface controller 411 to access a Web site of a vendor of the image processing apparatus, a Web site of a vendor of the OS, and so forth, which exist on the Internet 102. Further, the external interface controller 411 also transmits a scan job to the image processing apparatus 105 and receives a result of hold scan from the image processing apparatus 105. Note that the external interface controller 411 holds a Mac address as information for uniquely identifying the self apparatus, and holds IP addresses as information for dynamically identifying respective apparatuses/devices on the network.

A UI controller 414 provides information to the user of the information processing apparatus 104 using the display section 211 and the input section 212 (see FIG. 2) and receives an instruction from the user of the information processing apparatus 104. An OS 412 is an operating system stored in the ROM/RAM 207, for controlling the overall operation of the information processing apparatus 104, exchanges information between the software blocks of the information processing apparatus 104, and controls execution of the software. An internal interface controller 413 performs storage and readout of information of the OS 412, a scanner driver 416, application software 415, and so forth, stored in the external storage device 210 of the information processing apparatus 104.

The application software 415 is software for performing image processing, document creation, and so forth, and is stored in the ROM/RAM 207 for operation. To acquire an image from the image processing apparatus 105, the application software 415 instructs the scanner driver 416, takes in the image, and performs image processing, document creation, and so forth. The scanner driver 416 is stored in the ROM/RAM 207 for operation, takes in an image transmitted from the image processing apparatus 105, and transfers the image to the application software 415.

Figure 4B:
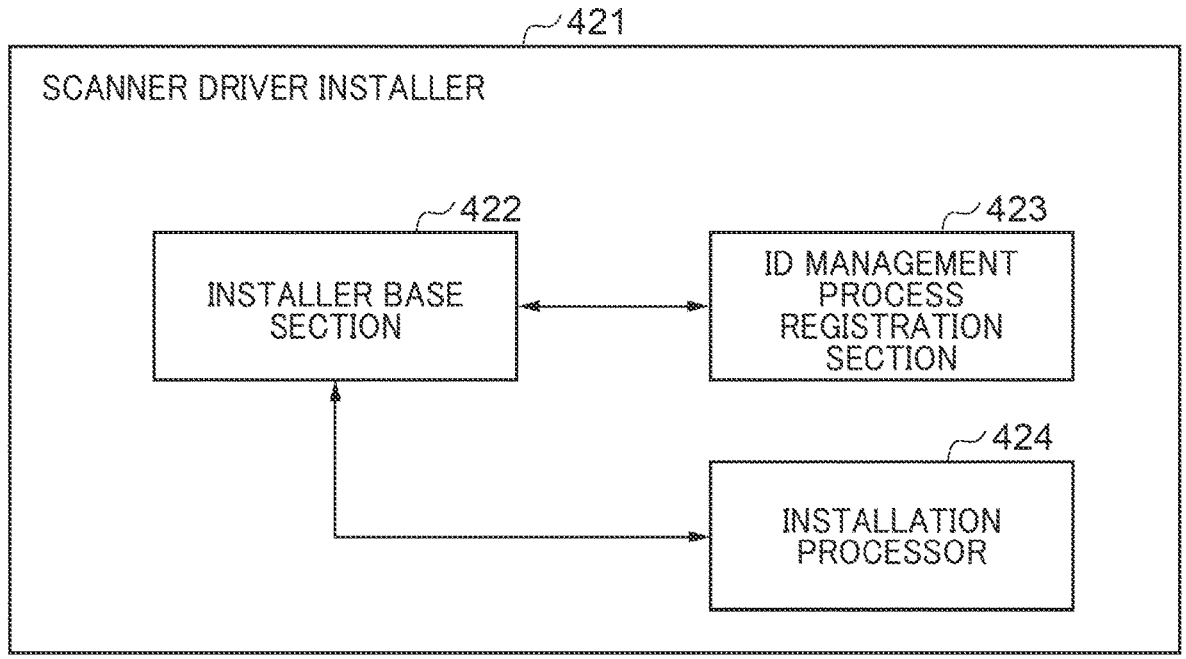

The scanner driver 416 has a scanner driver installer 421 for installing and setting the scanner driver 416 in the information processing apparatus 104. FIG. 4B is a block diagram of the scanner driver installer 421. An installer base section 422 manages software as a component of the scanner driver 416 and instructs an installation processor 424 to thereby configure the scanner driver 416 such that the OS 412 can call and use the scanner driver 416. An ID management process registration section 423 registers an ID management process 441 (see FIG. 4C), described hereinafter, in the OS 412 such that the ID management process 441 is automatically started up whenever the OS 412 is started up.

Figure 4C:
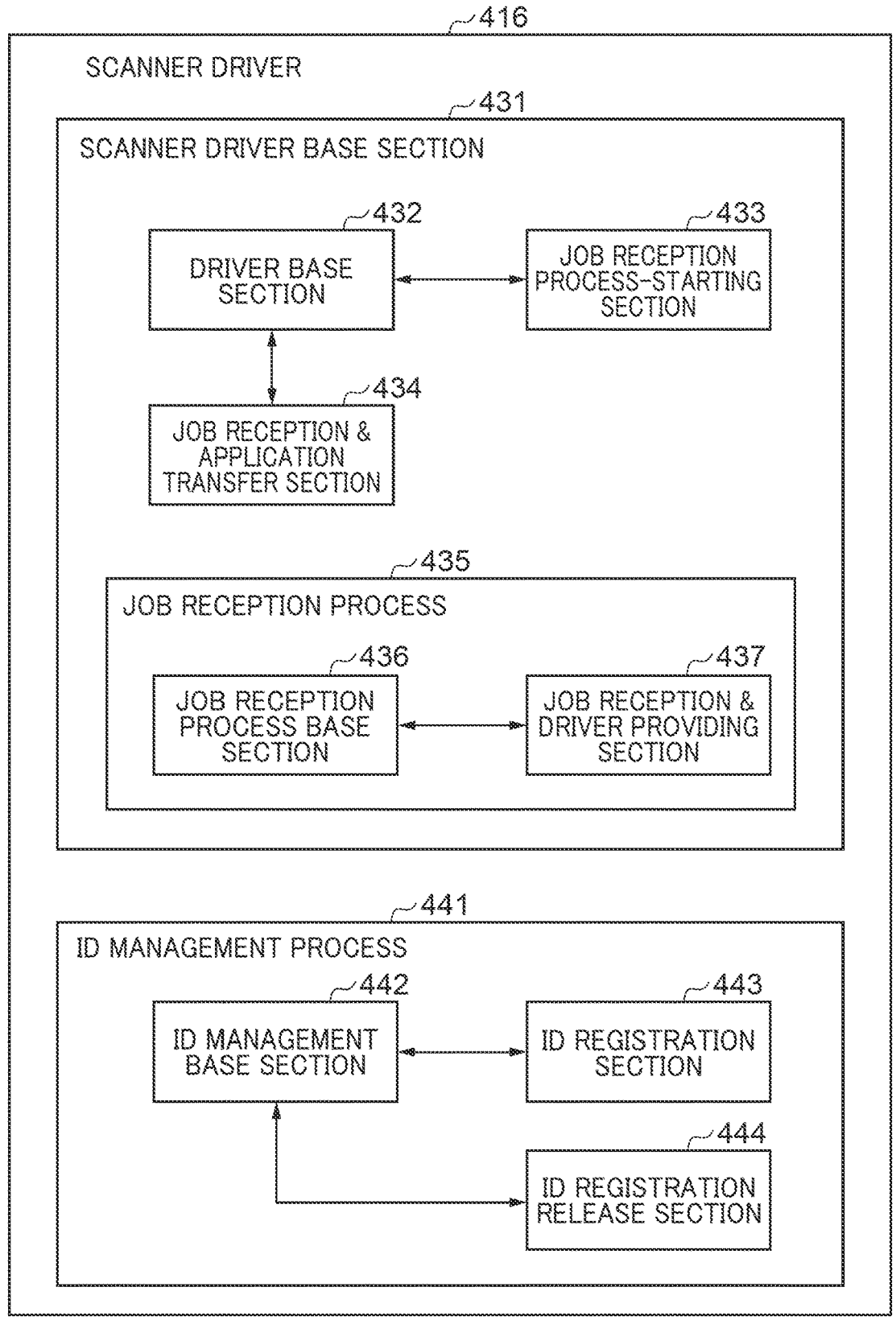

FIG. 4C is a detailed block diagram of the scanner driver 416. The scanner driver 416 has a scanner driver base section 431 and the ID management process 441. A driver base section 432 as a component of the scanner driver base section 431 performs basic processing. For example, the driver base section 432 displays a user interface of the scanner driver 416 on the display section 211, receives an instruction from the user, receives an instruction from the application software 415, and provides an instruction to the image processing apparatus 105.

A job reception process-starting section 433 starts up a job reception process 435 operating in the background. A job reception & application transfer section 434 receives a scanned image from the image processing apparatus 105 and provides the received image to the application software 415.

The job reception process 435 has a job reception process base section 436 and a job reception & driver providing section 437. The job reception process base section 436 waits for reception of an image from the image processing apparatus 105, determines completion of the reception, and stops its own processing. The job reception & driver providing section 437 receives a scanned image from the image processing apparatus 105 and provides the received image to the job reception & application transfer section 434.

An ID management base section 442 as a component of the ID management process 441 executes an ID registration section 443 in a case where the scanner driver 416 is called after starting the information processing apparatus 104 and calls an ID registration release section 444 in a case where the scanner driver 416 is called when shutting down the information processing apparatus 104. The ID registration section 443 forms an identifier (ID) by a set of the name of a PC (personal computer) of the information processing apparatus 104 and the name of a logged-in user and transmits the ID to an image processing apparatus to be connected. This ID information is processed by the image processing apparatus and used as a key for holding a held image. The ID registration release section 444 is executed when shutting down the information processing apparatus 104 and transmits an instruction for releasing the ID formed by the set of the name of the PC and the name of the logged-in user to the image processing apparatus 105 connected or to be connected before the information processing apparatus 104 shuts down the self apparatus. This instruction is processed by the image processing apparatus, and the key information for holding a held image is deleted.

Figure 5A:
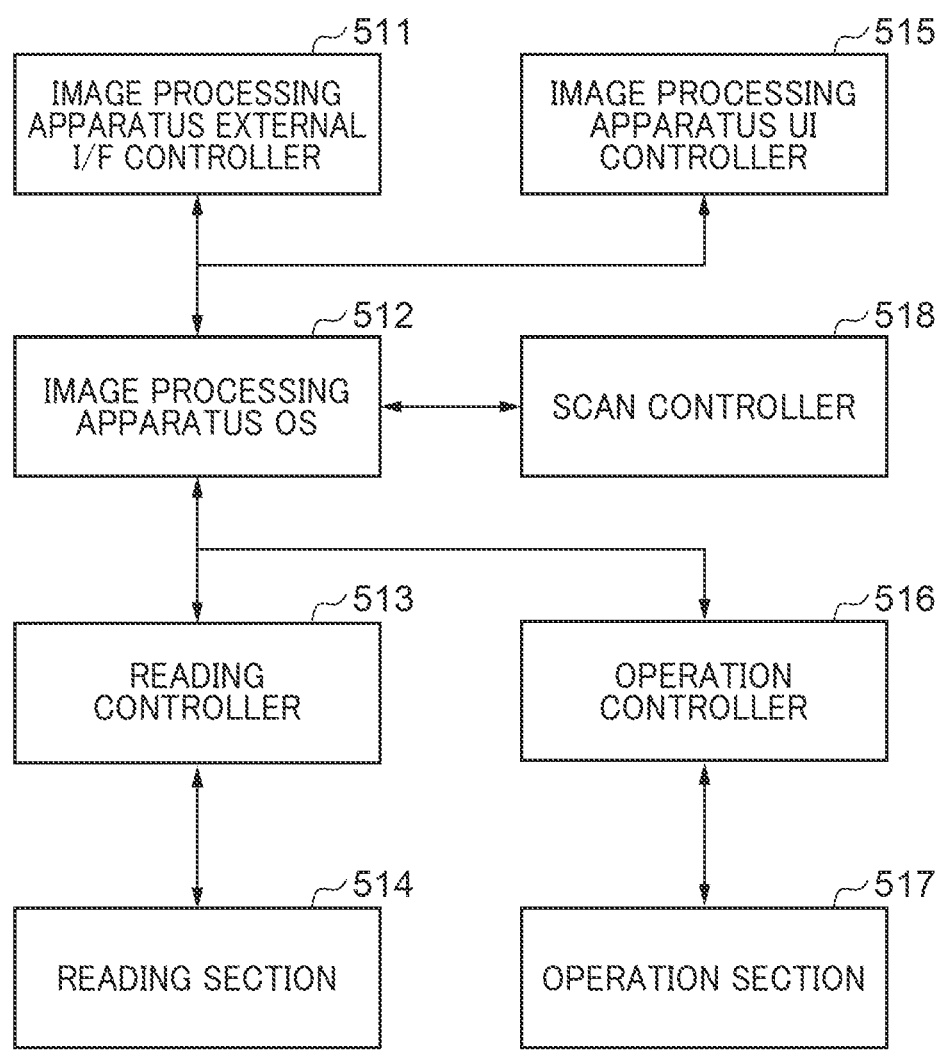
FIGS. 5A and 5B are block diagrams showing software and a scan controller of the image processing apparatus, respectively.

FIG. 5A is a software block diagram of the image processing apparatus 105. These software items are mainly stored in the ROM/RAM 307 (see FIG. 3), for operation. The functional sections shown in FIG. 5A are realized by cooperation of the CPU 306, the ROM/RAM 307, and so forth.

An image processing apparatus external interface controller 511 receives a scan request from the information processing apparatus 104 using the wired network interface 302 or the wireless network interface 303 (see FIG. 3) and delivers a scanned image from the image processing apparatus 105 to the information processing apparatus 104. An image processing apparatus OS 512 is an operating system that is stored in the ROM/RAM 307 and controls the overall operation of the image processing apparatus 105. The image processing apparatus OS 512 exchanges information between the software blocks of the image processing apparatus 105 and controls execution of the software.

A reading controller 513 converts image data acquired by a reading section 514 via the wired network interface 302, the wireless network interface 303, or the USB interface 304 (see FIG. 3) to data of a specified format. The reading section 514 optically reads an original using the reading section 316 (see FIG. 3) and generates image data in cooperation with the CPU 306.

An image processing apparatus UI controller 515 provides information to the user of the image processing apparatus 105 using the display section 313 and the input section 314 (see FIG. 3) and receives an instruction from the user of the image processing apparatus 105. The image processing apparatus UI controller 515 also performs ID selection for storing a held image. An operation controller 516 switches, in a case where the image processing apparatus 105 is a multifunction peripheral having a plurality of functions, between the functions including a copy function and a facsimile function. An operation section 517 performs, in a case where the image processing apparatus 105 is the multifunction peripheral, processing operations of the functions.

Figure 5B:
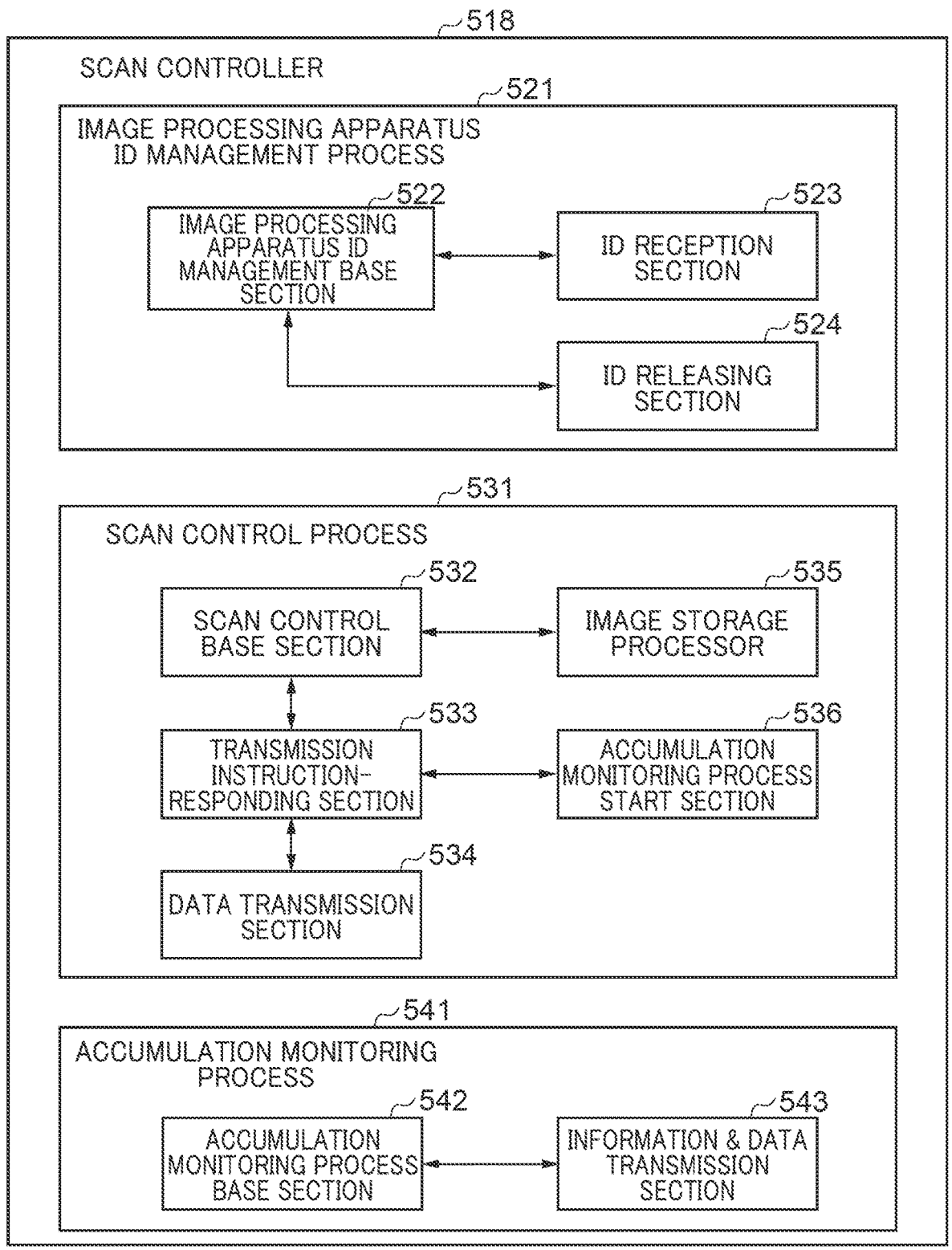

A scan controller 518 is intrinsically part of the operation section 517 but is described here as an independent function section. FIG. 5B is a block diagram of the scan controller 518. The scan controller 518 has an image processing apparatus ID management process 521, a scan control process 531, and an accumulation monitoring process 541.

An image processing apparatus ID management base section 522 as a component of the image processing apparatus ID management process 521 determines whether an instruction transmitted from the information processing apparatus 104 is an ID registration instruction or an ID registration-releasing instruction. An ID reception section 523 as a component of the image processing apparatus ID management process 521 receives information indicating an ID for holding an image associated therewith when hold scan is performed by the image processing apparatus 105, based on an ID registration instruction transmitted from the information processing apparatus 104. An ID releasing section 524 as a component of the image processing apparatus ID management process 521 accepts release of the information indicating the ID which servers as a source of association of a result of hold scan, which is managed by the image processing apparatus 105, based on an ID registration release request transmitted from the information processing apparatus 104.

A scan controller base section 532 as a component of the scan control process 531 controls processing associated with hold scan performed by the image processing apparatus 105. A transmission instruction-responding section 533 as a component of the scan control process 531 determines, according to a scan result transmission instruction transmitted from the information processing apparatus 104, an accumulation state of a held image at the time. Then, the transmission instruction-responding section 533 performs image transmission or transmits information indicating that no data has been accumulated.

A data transmission section 534 as a component of the scan control process 531 transmits a held image to the information processing apparatus 104. An image storage processor 535 as a component of the scan control process 531 stores a held image in the external storage device 312 of the image processing apparatus 105 in a state associated with a specified ID. An accumulation monitoring process start section 536 as a component of the scan control process 531 is called in a case where no held image has been accumulated when a scan result transmission instruction transmitted from the information processing apparatus 104 is received and starts the accumulation monitoring process 541.

An accumulation monitoring process base section 542 as a component of the accumulation monitoring process 541 is base part of a process for monitoring a state of accumulation of a held image associated with a scan result transmission instruction transmitted from the information processing apparatus 104. An information & data transmission section 543 as a component of the accumulation monitoring process 541 provides, when accumulation of a held image associated with a scan result transmission instruction transmitted from the information processing apparatus 104 has been performed, the held image to the data transmission section 534.

Figure 6A:
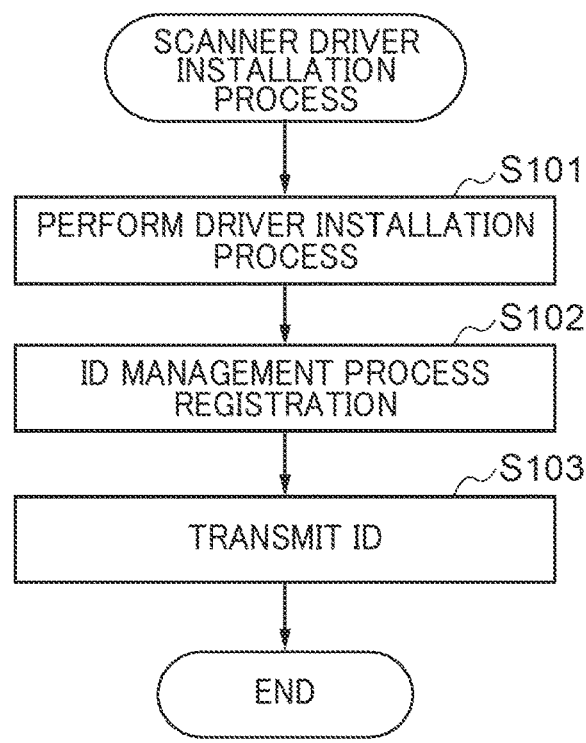
FIGS. 6A to 6C are flowcharts showing a scanner driver installation process, an ID management-processing process, and an application process, respectively.
Figure 6B:
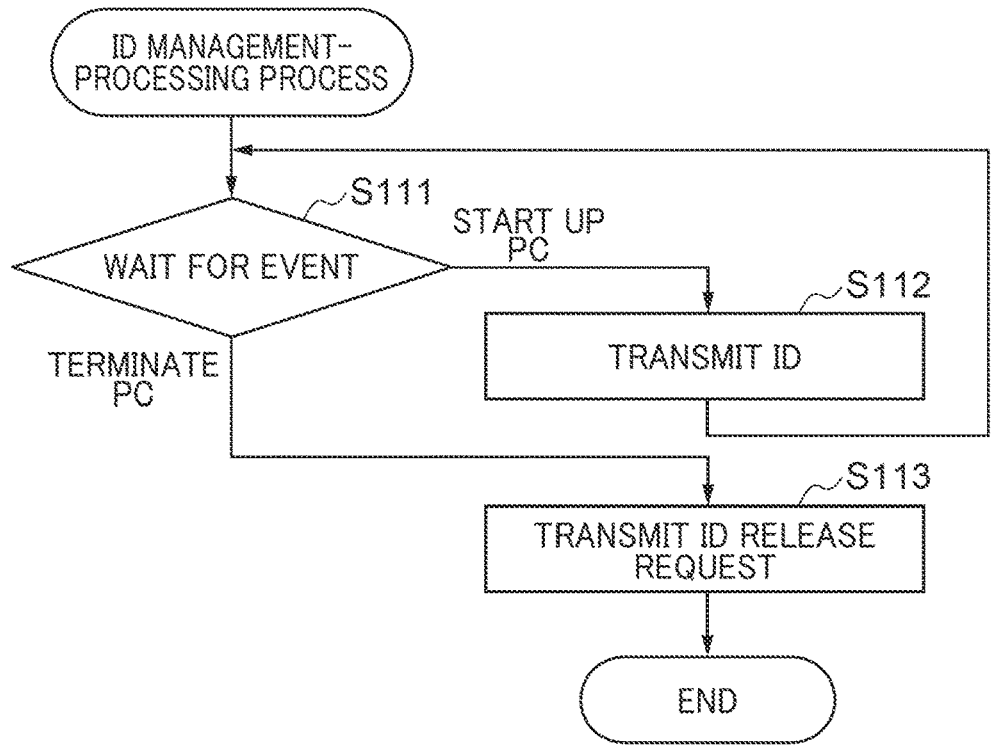
Figure 6C:
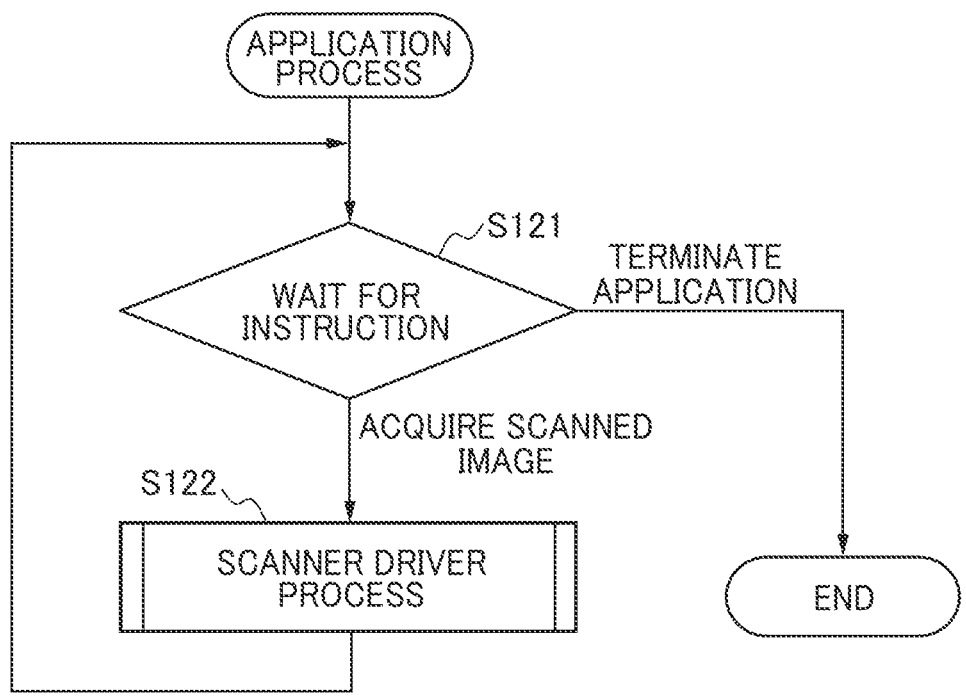
Figure 8:
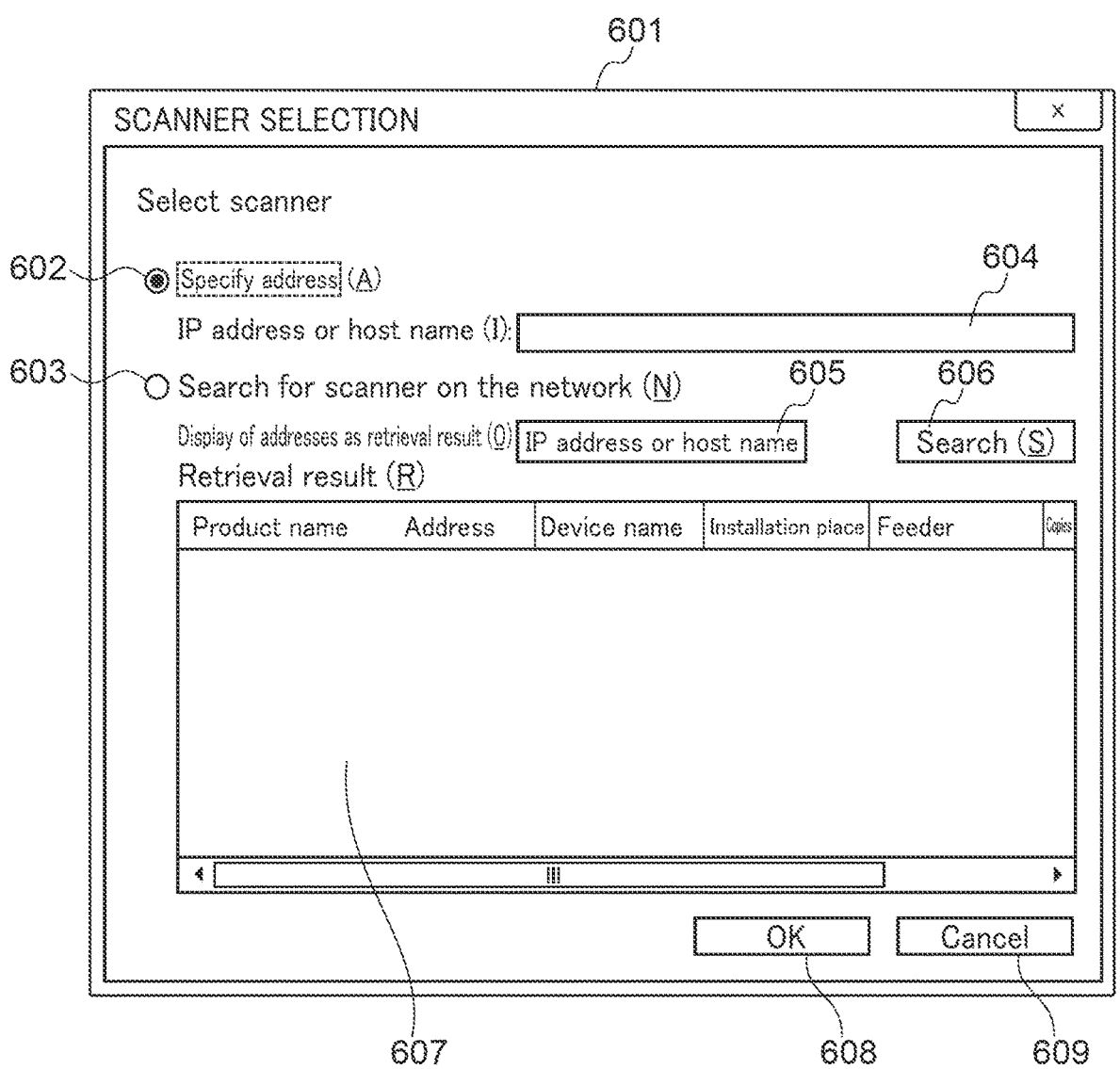
FIG. 8 is a diagram showing an example of a screen displayed on a display section of the information processing apparatus.

Next, a description will be given mainly of a process performed by the information processing apparatus 104 with reference to FIGS. 6A to 11G. FIG. 6A is a flowchart of a scanner driver installation process. FIG. 6B is a flowchart of an ID management-processing process. FIG. 6C is a flowchart of an application process. FIG. 7A is a flowchart of a job reception process. FIG. 7B is a flowchart of a scanner driver process executed in a step S122 in FIG. 6C. These processes are realized by the CPU 206 that executes programs stored in the ROM/RAM 207.

Further, these processes will be described with reference to FIGS. 8 to 11G on an as-needed basis. FIG. 8 and FIGS. 10A to 10D are diagrams each showing an example of a screen displayed on the display section 211 of the information processing apparatus 104. FIGS. 9A to 9D are diagrams each showing an example of a screen displayed on the display section 313 of the image processing apparatus 105. FIGS. 11A to 11G are diagrams each showing an example of data transmitted and received between the information processing apparatus 104 and the image processing apparatus 105.

The scanner driver installation process shown in FIG. 6A is started when a user of the information processing apparatus 104 causes the scanner driver installer 421 in the ROM/RAM 207 to be executed, via the UI controller 414.

In a step S101, the OS 412 performs processing for installing the scanner driver 416 and enables the scanner driver 416 to operate in cooperation with the OS 412. Note that at this time, a screen 601 shown in FIG. 8 may be displayed on the display section 211 to enable the user to select the image processing apparatus 105. In this example, a plurality of methods of selecting the image processing apparatus 105 are available.

A first one of the methods is that, after selecting a selection method 602, the user directly enters the IP address of the image processing apparatus 105 in a column 604, and then presses an OK button 608. A second one of the methods is that, after selecting a selection method 603, the user presses a column 605, specifies the IP address or host name of an image processing apparatus 105, and then presses a button 606 to search for the specific image processing apparatus 105. A third one of the methods is that, the user presses the button 606 without pressing the column 605, to thereby cause the scanner driver 416 on the network to search for all image processing apparatuses 105 as processing targets. Results of search are displayed in an area 607, and in a case where there are found a plurality of image processing apparatuses (scanners) as a result of search, the user selects one of them and presses the OK button 608. In a case where the user does not select any image processing apparatus 105 here, the user may interrupt the processing by pressing a cancel button 609.

In a step S102, the scanner driver installer 421 registers the ID management process 441 such that acquisition of a held image can be normally performed when the information processing apparatus 104 is started up next time. The ID management process 441 is a program that operates when the information processing apparatus 104 is started up and is managed by the OS 412. With this registration processing, the ID management process 441 is configured to be started whenever the information processing apparatus 104 is started up.

In a step S103, since it is immediately after the scanner driver 416 has been installed, the scanner driver installer 421 individually transmits the ID (the PC name and the user name) to the image processing apparatus 105. At this time, data 1101 shown in FIG. 11A is transmitted from the information processing apparatus 104 to the image processing apparatus 105. The data 1101 includes information indicating that the data is registration request information (Setting Info) and information on the information processing apparatus 104 (IP address: 100.110.120.210, PC name: Soumu01, and user name: Yamada Taro). The data 1101 further includes information on the image processing apparatus 105 (IP address: 100.110.120.130) and so forth. Note that the data 1101 is not limited to such data in an XML format.

Note that in a case where data is transmitted from the information processing apparatus 104 to the image processing apparatus 105, a response indicating that the data has been normally received is transmitted as data 1107 shown in FIG. 11F. Inversely, in a case where data is transmitted from the image processing apparatus 105 to the information processing apparatus 104, a response indicating that the data has been normally received is transmitted as data 1103 shown in FIG. 11C. After execution of the step S103, the series of the process for installing the scanner driver 416 in FIG. 6A is terminated.

The ID management-processing process shown in FIG. 6B is automatically started by the OS 412 of the information processing apparatus 104 when the information processing apparatus 104 is started up.

In a step S111, the ID management base section 442 of the ID management process 441 waits for an event from the OS 412 and determines, in a case where any event is received, the contents of the received event. The event determined in this step is one of the two events: an event at the startup time of the information processing apparatus 104 and an event at the termination time of the information processing apparatus 104, and other events are ignored. If it is determined that the received event is the event at the startup time of the information processing apparatus 104, the ID management base section 442 proceeds to a step S112, whereas if it is determined that the received event is the event at the termination time of the information processing apparatus 104, the ID management base section 442 proceeds to a step S113.

In the step S112, the ID registration section 443 of the ID management process 441 forms an ID by a set of the PC name which is the name of the information processing apparatus 104 and the name of the logged-in user, transmits registration request information of the ID to the image processing apparatus 105, and then returns to the step S111. At this time, the data 1101 shown in FIG. 11A is transmitted from the information processing apparatus 104 to the image processing apparatus 105.

In the step S113, the ID registration release section 444 of the ID management process 441 transmits registration release request information of the ID formed by the set of the PC name which is the name of the information processing apparatus 104 and the name of the logged-in user to the image processing apparatus 105. At this time, data 1104 shown in FIG. 11G is transmitted from the information processing apparatus 104 to the image processing apparatus 105.

The data 1104 includes information indicating that the data is the registration release request information (Remove Info) and the information on the information processing apparatus 104 (IP address: 100.110.120.210, PC name: Soumu01, and user name: Yamada Taro). The data 1104 further includes the information on the image processing apparatus 105 (IP address: 100.110.120.130) and so forth. Note that the data 1104 is not limited to such data in the XML format. After execution of the step S113, the ID registration release section 444 terminates the process shown in FIG. 6B.

The application process shown in FIG. 6C is started when the OS 412 of the information processing apparatus 104 starts up the application software 415. The application software 415 is software for performing image processing, document creation, and so forth.

In a step S121, the OS 412 waits for an instruction input from the input section 212 to the application software 415, and in a case where an instruction is input, the OS 412 determines the contents of the instruction. Note that instructions for image processing, document creation, and the like, are omitted from the flowchart in FIG. 6C. If it is determined that the input instruction is an instruction for terminating the application software 415 itself, the OS 412 terminates the present process. If it is determined that the input instruction is an instruction for acquiring a scanned image, the OS 412 proceeds to the step S122. In the step S122, the OS 412 executes the scanner driver process (see FIG. 7B), described hereafter, and returns to the step S121.

In the scanner driver process (in FIG. 7B), the scanner driver 416 started by the OS 412 starts processing. In the scanner driver 416, the functions are separated such that processing for settings, such as resolution setting and a color/monochrome setting, which can be performed by a general scanner driver, is performed by the image processing apparatus 105.

Referring to FIG. 7B, in a step S204, the scanner driver 416 issues a transmission instruction for a result of hold scan (image transmission request) to the image processing apparatus 105. The issue destination of this transmission request is the image processing apparatus 105 specified on the screen 601 (see FIG. 8), and the ID formed by the set of the PC name which is the name of the information processing apparatus 104 and the name of the logged-in user is also included in the transmission instruction. In this transmission instruction, data 1102 shown in FIG. 11B is transmitted from the information processing apparatus 104 to the image processing apparatus 105. Note that the step S204 will also be described in detail in scan result transmission instruction processing 1202 (see FIG. 14A).

The data 1102 includes information indicating that the data is a held image acquisition request (Box), information on the information processing apparatus 104 (PC name: Soumu01 and user name: Yamada Taro), and so forth, but is not limited to such data in the XML format.

In a step S205, the scanner driver 416 waits for a response from the image processing apparatus 105. Here, the response from the image processing apparatus 105 to the transmission instruction is roughly divided into two types. First, there is a case where the response to the transmission request is transmission of an image associated with the transmission instruction (data reception). Further, there is a case where the response to the transmission request is transmission of NoData which is information indicating that there is no image associated with the transmission instruction.

Figure 13A:
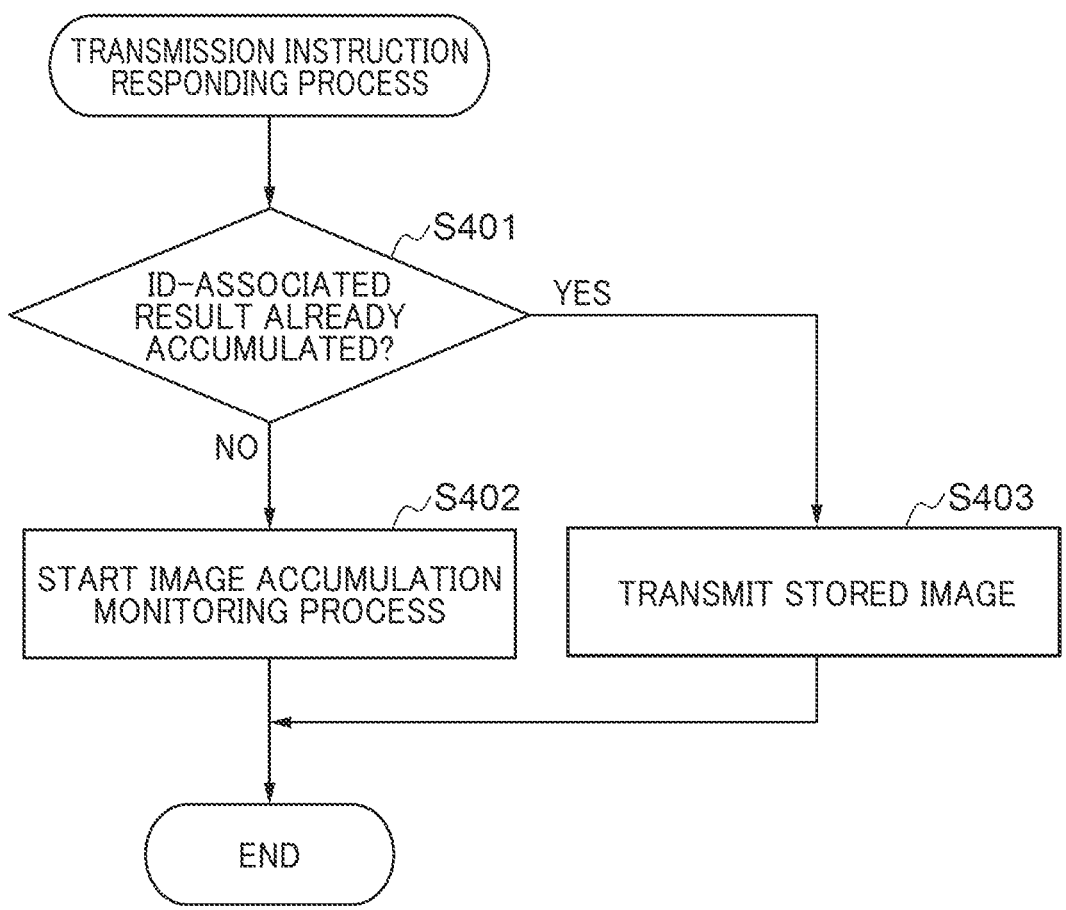
FIGS. 13A to 13C are flowcharts showing a transmission instruction responding process, an image accumulation-monitoring process, and an image storage responding process, respectively.

More specifically, in a case where a held image has already been accumulated in the image processing apparatus 105 before receiving the instruction for transmitting the result of hold scan, the response from the image processing apparatus 105 is transmission of image data associated with the transmission instruction (step S403 in FIG. 13A). On the other hand, in a case where no held image has been accumulated in the image processing apparatus 105 before receiving the instruction for transmitting the result of hold scan, the response from the image processing apparatus 105 is transmission of NoData (step S411 in FIG. 13B).

Therefore, if the response to the transmission request is transmission of an image associated with the transmission instruction, the scanner driver 416 proceeds to a step S206, whereas if the response to the transmission request is transmission of NoData, the scanner driver 416 proceeds to a step S208. Data 1106 shown in FIG. 11E shows an example of NoData. Although in the data 1106, "No content" as a response to the http request is used, this is not limitative.

In the step S206, the job reception & application transfer section 434 receives all image data transmitted from the image processing apparatus 105 until no image data is left. At this time, an example of the image data transmitted from the image processing apparatus 105 to the information processing apparatus 104 is data 1105 shown in FIG. 11D. The data 1105 includes information on the information processing apparatus 104 (IP address), information on the image processing apparatus 105 (image format: jpeg, data length: 12000, and image data: binary data), and so forth. However, the data is not limited to such data in the XML format.

In a step S207, the job reception & application transfer section 434 transfers the received image to the application software 415, and the application software 415 displays the received image, followed by terminating the present process.

In the step S208, the scanner driver 416 displays information indicating that no held image has been accumulated in the image processing apparatus 105, on the display section 211, to thereby notify the user of the information processing apparatus 104 of the fact. For example, the scanner driver 416 displays a screen 821 shown in FIG. 10C on the display section 211 of the information processing apparatus 104 to thereby prompt the user to perform processing for holding an image (by scanning an image) by the image processing apparatus 105 via the user interface.

In a step S209, the scanner driver 416 determines whether or not a "stop" button has been pressed, on the screen 821, within a predetermined time period. Then, if the "stop" button has been pressed within the certain time period, the scanner driver 416 terminates the present process. At this time, in a case where a job reception process (see FIG. 7A), described hereinafter, is being executed, the scanner driver 416 also terminates this process.

On the other hand, if it is determined in the step S209 that the "stop" button has not been pressed within the predetermined time period, the scanner driver 416 proceeds to a step S210. Note that in a case where not only the "stop" button, but also an "execute" button is arranged, the process may proceed to the step S210 when the "execute" button is pressed.

In the step S210, the job reception process-starting section 433 starts the job reception process 435 operating in the background in the information processing apparatus 104, followed by terminating the process shown in FIG. 7B.

The job reception process shown in FIG. 7A is started in the step S210 and operated by the job reception process 435 in the background. In this process, the job reception process 435 functions as monitoring means for monitoring whether or not an image associated with a transmission instruction has been received.

Referring to FIG. 7A, in a step S201, the job reception process base section 436 determines whether or not a held image has been received from the image processing apparatus 105. In this processing, if it is determined that no held image has been received, the determination is executed again after a predetermined time interval. Then, if it is determined that a held image has been received, the job reception process base section 436 proceeds to a step S202. This held image corresponds to image data transmitted in a step S413 in FIG. 13B, described hereinafter. In the step S202, the job reception & driver providing section 437 receives all of the image data transmitted from the image processing apparatus 105 until no image data is left.

In a step S203, the job reception & driver providing section 437 provides the received image to the scanner driver 416. With this, thereafter, in the step S207 in FIG. 7B, the received image is transferred to the application software 415, and the application software 415 causes the scanned image to be displayed. After execution of the step S203, the process shown in FIG. 7A is terminated. That is, the job reception process is terminated when reception of the image data associated with the transmission request is completed.

Figure 12:
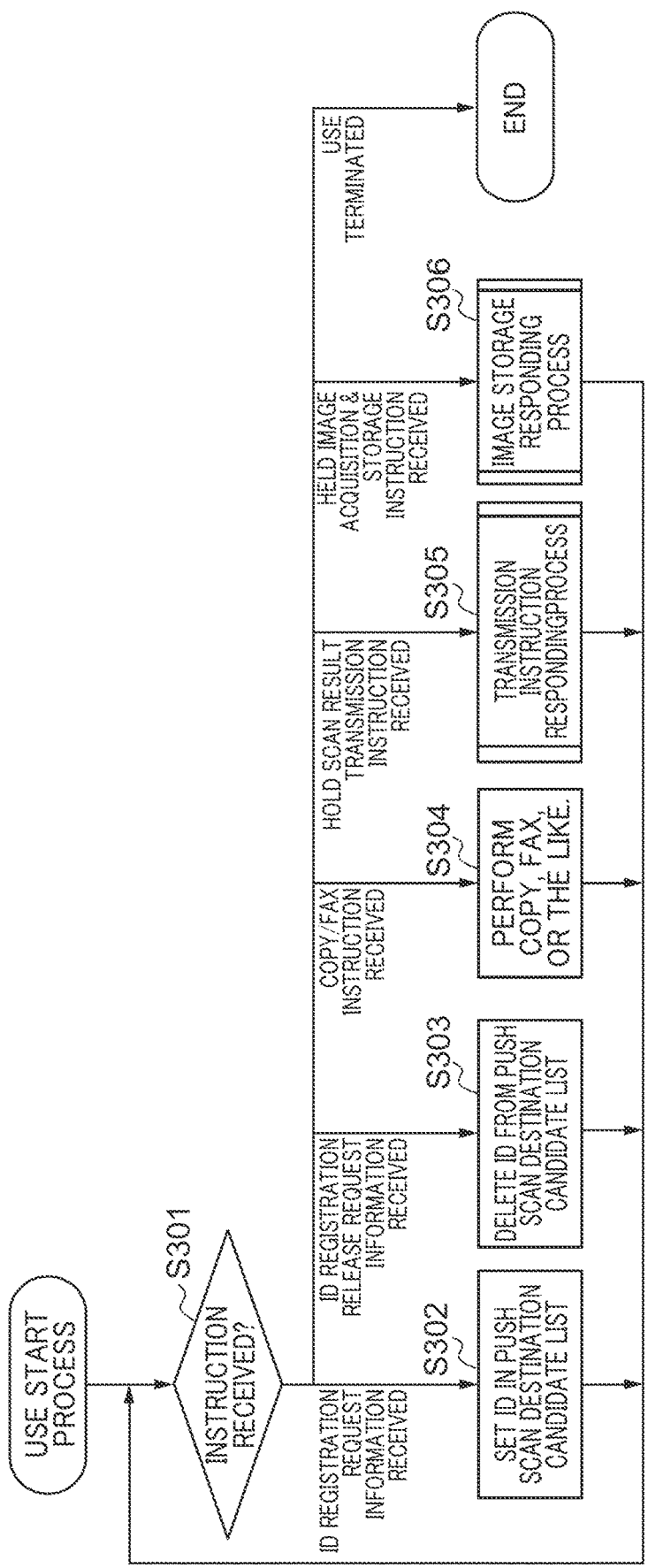
FIG. 12 is a flowchart of a use start process.
Figure 13B:
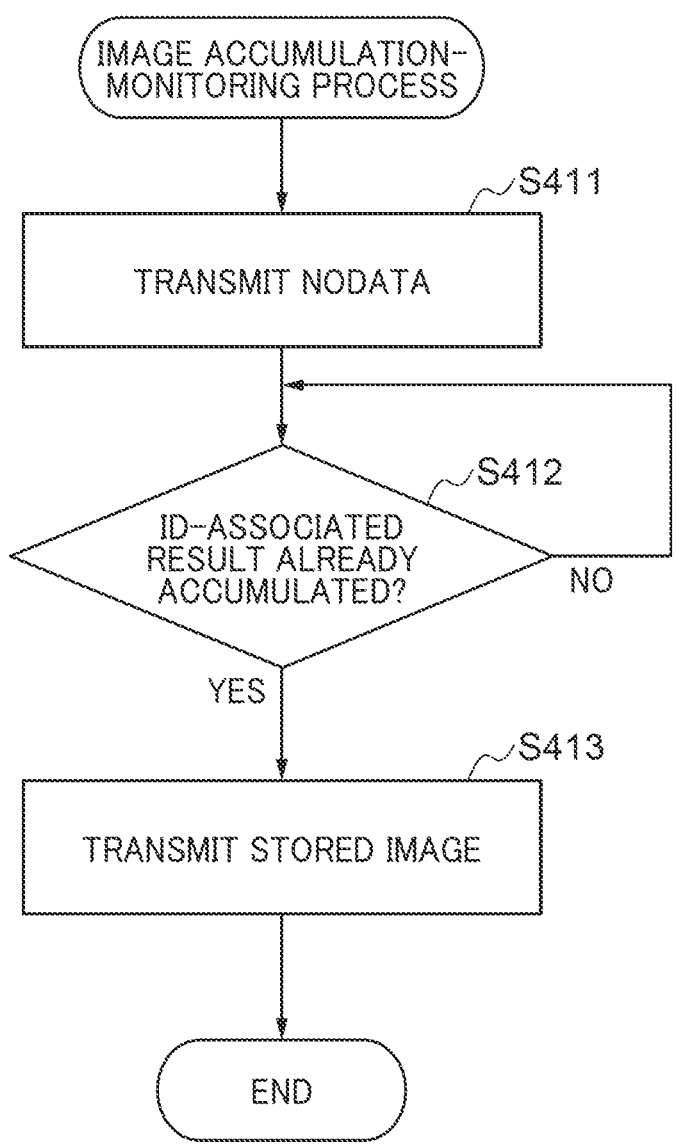
Figure 13C:
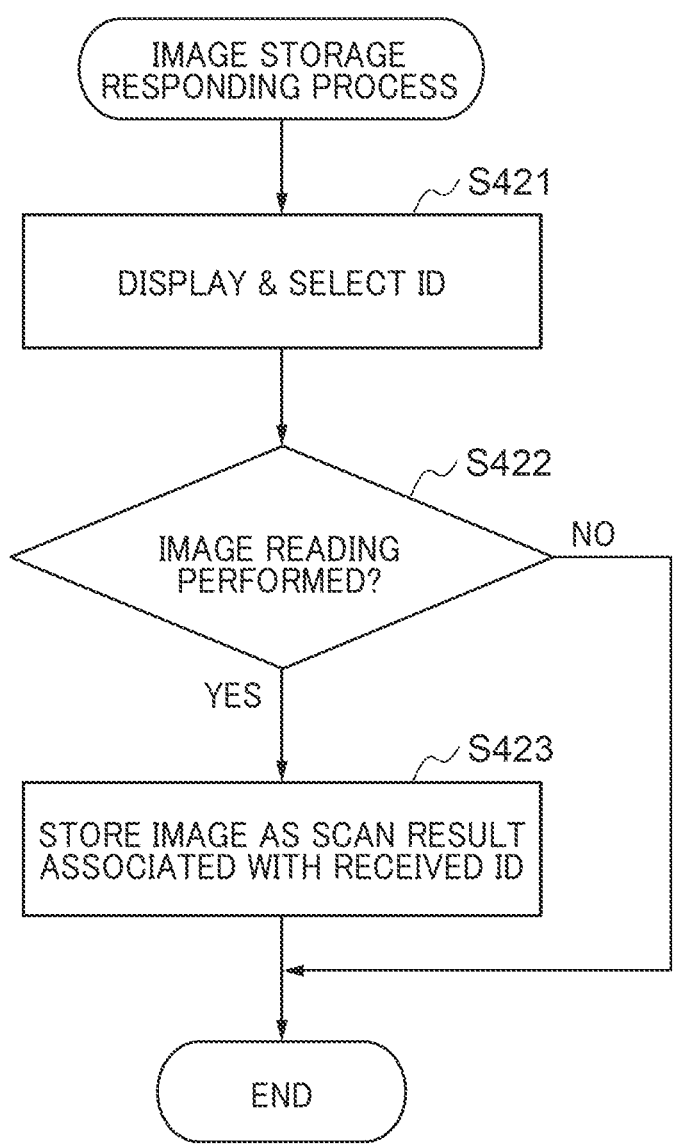

Next, a description will be given mainly of a process performed by the image processing apparatus 105 with reference to FIGS. 12, and 13A to 13C. FIG. 12 is a flowchart of a use start process. FIG. 13A is a flowchart of a transmission instruction responding process. FIG. 13B is a flowchart of an image accumulation-monitoring process. FIG. 13C is a flowchart of an image storage responding process. These processes are realized by the CPU 306 that executes programs stored in the ROM/RAM 307.

The use start process (see FIG. 12) is started when the user of the image processing apparatus 105 causes the image processing apparatus OS 512 in the ROM/RAM 307 to be started via the image processing apparatus UI controller 515. Note that after being started, the image processing apparatus OS 512 automatically starts the scan controller 518, and the scan controller 518 starts the image processing apparatus ID management process 521 and the scan control process 531, which are included therein.

Referring to FIG. 12, in a step S301, the image processing apparatus OS 512 waits for an instruction to the image processing apparatus 105 and branches the process according to an input instruction. In this step, the image processing apparatus OS 512 collectively judges contents of an instruction given via the image processing apparatus UI controller 515 and contents of information transmitted from the information processing apparatus 104. Note that a variety of setting processing operations performed to use the image processing apparatus 105 are omitted from the present flowchart.

Then, if an instruction for terminating the image processing apparatus 105 itself has been input, the image processing apparatus OS 512 terminates the present process to terminate the use of the image processing apparatus 105 by the user. If ID registration request information transmitted from the information processing apparatus 104 has been received, the image processing apparatus OS 512 proceeds to a step S302. If ID registration release request information transmitted from the information processing apparatus 104 has been received, the image processing apparatus OS 512 proceeds to a step S303. If a copy or FAX instruction has been received via the image processing apparatus UI controller 515, the image processing apparatus OS 512 proceeds to a step S304. If a hold scan result transmission instruction transmitted from the information processing apparatus 104 has been received, the image processing apparatus OS 512 proceeds to a step S305. If an instruction for acquiring and storing a held image has been received via the image processing apparatus UI controller 515, the image processing apparatus OS 512 proceeds to a step S306.

In the step S302, the ID reception section 523 allocates, based on the ID registration request information transmitted from the information processing apparatus 104, an area for storing and accumulating a held image associated with the received ID, to the external storage device 312. Further, the ID reception section 523 adds the information on the received ID in a held image storage destination list (Push-Scan destination candidate list) which serves as a source of information to be displayed on the image processing apparatus UI controller 515.

In the step S303, the ID releasing section 524 releases, based on the ID registration release request information transmitted from the information processing apparatus 104, the area allocated to the external storage device 312 for storing and accumulating an held image associated with the received ID. Further, the ID releasing section 524 deletes the information on the received ID from the held image storage destination list.

In the step S304, according to the copy or FAX instruction, the image processing apparatus OS 512 controls the image processing apparatus 105 to execute associated processing. In the step S305, the image processing apparatus OS 512 starts the transmission instruction responding process (see FIG. 13A), described hereinafter, so as to respond to the hold scan result transmission instruction transmitted from the information processing apparatus 104. In the step S306, the scan control base section 532 starts the image storage responding process (see FIG. 13C), described hereinafter, so as to respond to the user's operation for selecting the processing for acquiring and storing a held image via the image processing apparatus UI controller 515 of the image processing apparatus 105. After execution of the steps S302 to S306, the image processing apparatus OS 512 returns to the step S301.

The transmission instruction responding process shown in FIG. 13A is started in the step S305 in FIG. 12. In a step S401, the transmission instruction-responding section 533 determines whether or not a held image as a result of hold scan associated with the ID transmitted from the information processing apparatus 104 exists (is accumulated) in the external storage device 312 of the image processing apparatus 105. If it is determined that a held image as a result of hold scan based on the transmitted ID exists in the external storage device 312, the transmission instruction-responding section 533 proceeds to the step S403, whereas if not, the transmission instruction-responding section 533 proceeds to a step S402.

In the step S402, since a held image as a result of hold scan associated with the transmitted ID does not exist, the accumulation monitoring process start section 536 starts the accumulation monitoring process 541 to start an image accumulation-monitoring process (see FIG. 13B), followed by terminating the present process.

In the step S403, the data transmission section 534 transmits the held image as the result of hold scan associated with the above-mentioned ID, which is stored in the external storage device 312 of the image processing apparatus 105, to the information processing apparatus 104, followed by terminating the present process. With this, the image data is transmitted as a response to the transmission instruction.

Therefore, in the information processing apparatus 104, it is determined in the step S205 in FIG. 7B that the associated image data has been received as a response to the transmission request, and reception of the image data is continued (step S206).

The image accumulation-monitoring process shown in FIG. 13B is started in the step S402 in FIG. 13A, causing the accumulation monitoring process 541 to start the process. In this process, a state of accumulation of a held image as a result of hold scan in the storage area of the external storage device 312 is monitored.

In the step S411, the information & data transmission section 543 transmits NoData as the information indicating that a held image as a result of hold scan associated with the ID transmitted from the information processing apparatus 104 has not been stored to the information processing apparatus 104. That is, the NoData is transmitted as a response to the transmission request. Therefore, in the information processing apparatus 104, it is determined in the step S205 in FIG. 7B that the NoData has been received as the response to the transmission request, and the process proceeds to the step S208. Note that it is only required to notify the information processing apparatus 104 that there is no data to be transmitted, and hence the contents of the response are not limited to NoData.

In a step S412, the accumulation monitoring process base section 542 waits until a held image as a result of hold scan associated with the transmitted ID is accumulated, and if it is determined that the held image as the associated result of hold scan has been accumulated, the accumulation monitoring process base section 542 proceeds to the step S413. Note that when an image storage responding process (see FIG. 13C), described hereinafter, is executed in the loop of the step S412, whereby a held image as the result of hold scan is stored in the external storage device 312 in a step S423, it is possible to exit the loop. In the step S413, the information & data transmission section 543 transmits the accumulated image data to the information processing apparatus 104, followed by terminating the present process. Note that due to the image data transmitted in this step, in the information processing apparatus 104, it is determined in the step S201 in FIG. 7A that the held image has been received as the response to the transmission request, and the reception of image data is continued in the step S202.

The image storage responding process shown in FIG. 13C is started in the step S306 in FIG. 12. In a step S421, the scan control base section 532 displays IDs received by the image processing apparatus 105 up to the time point, on the image processing apparatus UI controller 515. With this, the user can select an ID associated with a result of hold scan to be stored.

In a step S422, the scan control base section 532 determines whether or not image reading has been actually started. If it is determined that image reading is not performed, i.e. the processing is canceled, the scan control base section 532 terminates the present process. On the other hand, if it is determined that image reading has been performed, the scan control base section 532 proceeds to the step S423.

In the step S423, the scan control base section 532 stores the held image as the result of hold scan associated with the ID transmitted from the information processing apparatus 104 in the external storage device 312 of the image processing apparatus 105, followed by terminating the present process.

Figure 14A:
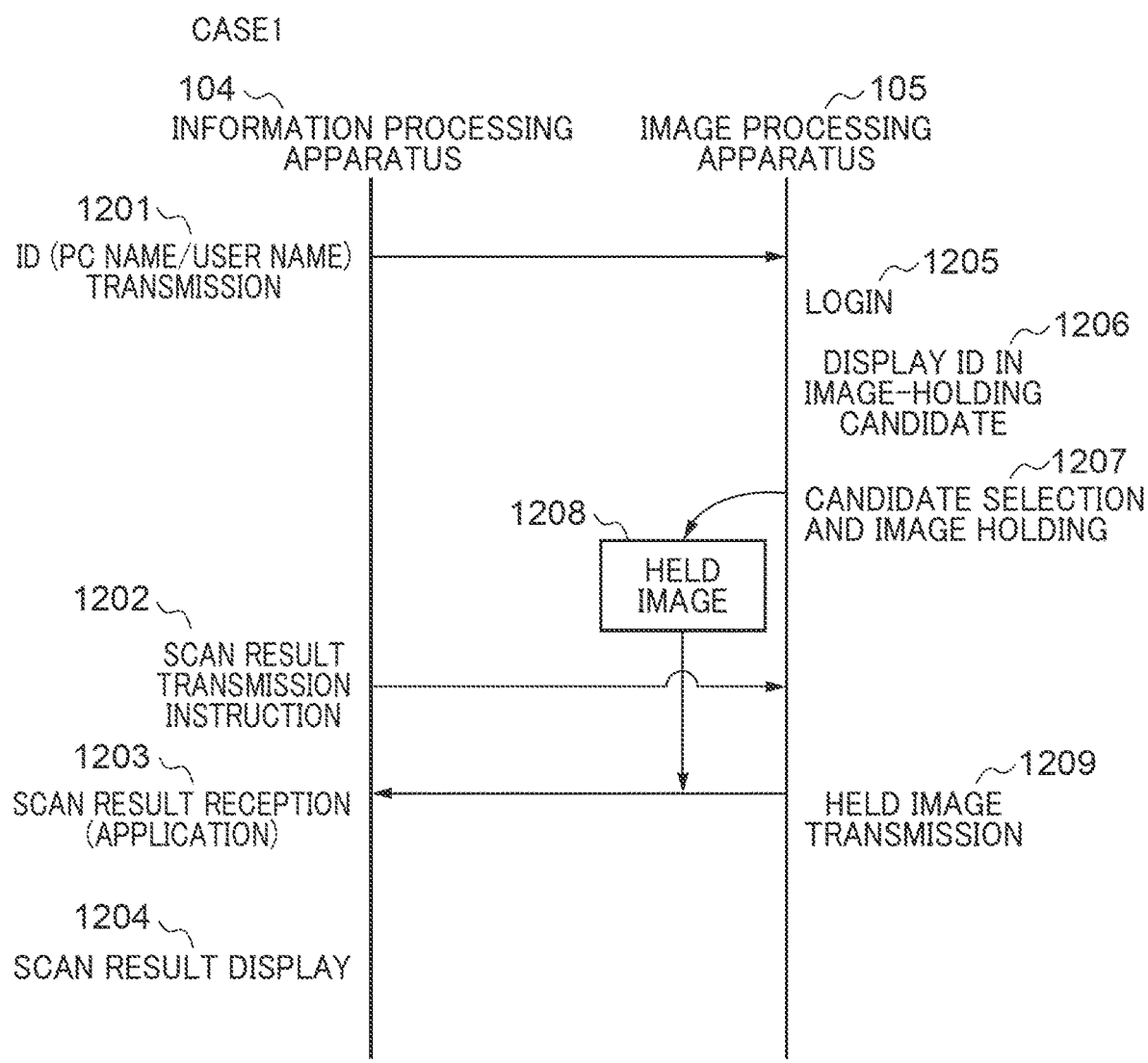
FIGS. 14A and 14B are diagrams each showing an example of data exchange between the information processing apparatus and the image processing apparatus on a time-series basis.
Figure 14B:
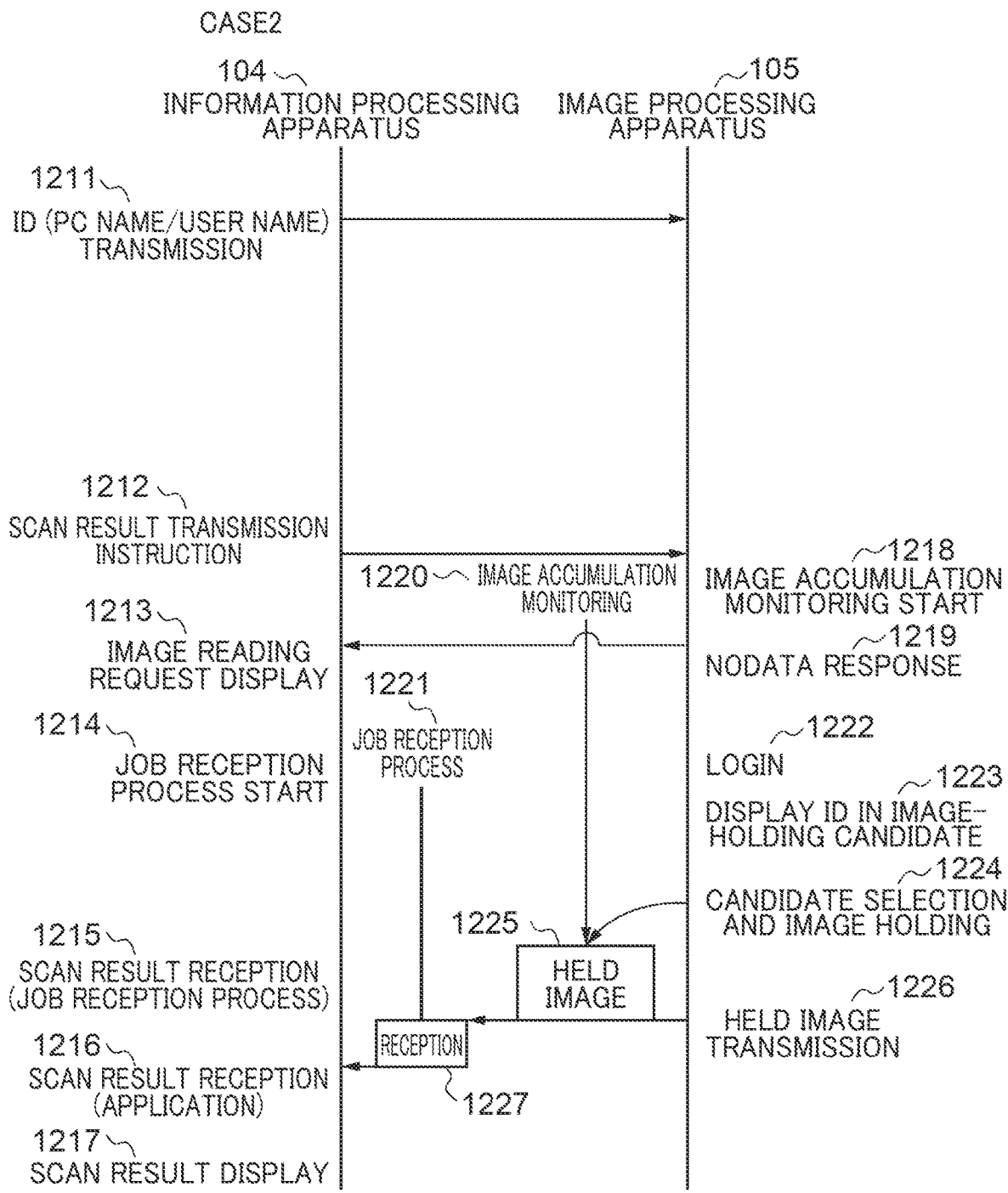

FIGS. 14A and 14B are diagrams each showing an example of data exchange between the information processing apparatus 104 and the image processing apparatus 105 on a time-series basis. FIG. 14A shows a case 1, and FIG. 14B shows a case 2.

The case 1 is a case where a scan result transmission instruction is transmitted from the information processing apparatus 104 to the image processing apparatus 105 after a held image is held in the external storage device 312 of the image processing apparatus 105, and the scan image is transmitted to the information processing apparatus 104. The case 2 is a case where a scan result transmission instruction is transmitted from the information processing apparatus 104 to the image processing apparatus 105, then, a held image is held in the external storage device 312 of the image processing apparatus 105, and the scan image is transmitted to the information processing apparatus 104.

First, the case 1 (see FIG. 14A) will be described. ID (PC name and user name) transmission processing 1201 corresponds to the step S103 (see FIG. 6A) or the step S112 (see FIG. 6B). Login processing 1205 corresponds to the step S302 (see FIG. 12), in which the login processing using a user name is simply performed with respect to the image processing apparatus 105. Here, an example is described in which the user has logged in the image processing apparatus 105 using the user name "Yamada Taro".

Processing 1206 for displaying an ID associated with a user name as an image-holding candidate corresponds to the step S421 (see FIG. 13C), in which IDs associated with the user name are displayed in a list of image-holding candidates. Specifically, a screen 711 shown in FIG. 9B by way of example is displayed on the display section 313 of the image processing apparatus 105. For example, on the screen 711, a held image storage destination of a user, named "Yamada Taro", of a PC, named "Soumu01", is displayed in an item row 712. Further, a held image storage destination of the user, named "Yamada Taro", of a PC, named "Soumu02", is displayed in an item row 713.

The two image storage destinations are displayed because all IDs matching the name of the logged-in user in the held image storage destination list are displayed. That is, this example shows a case where the user named "Yamada Taro" uses the two PCs (information processing apparatuses 104) named "Soumu01" and "Soumu02". The item rows 712 and 713 corresponding to the displayed IDs can be selected by the user operating the console section interface 309.

Figure 9A:
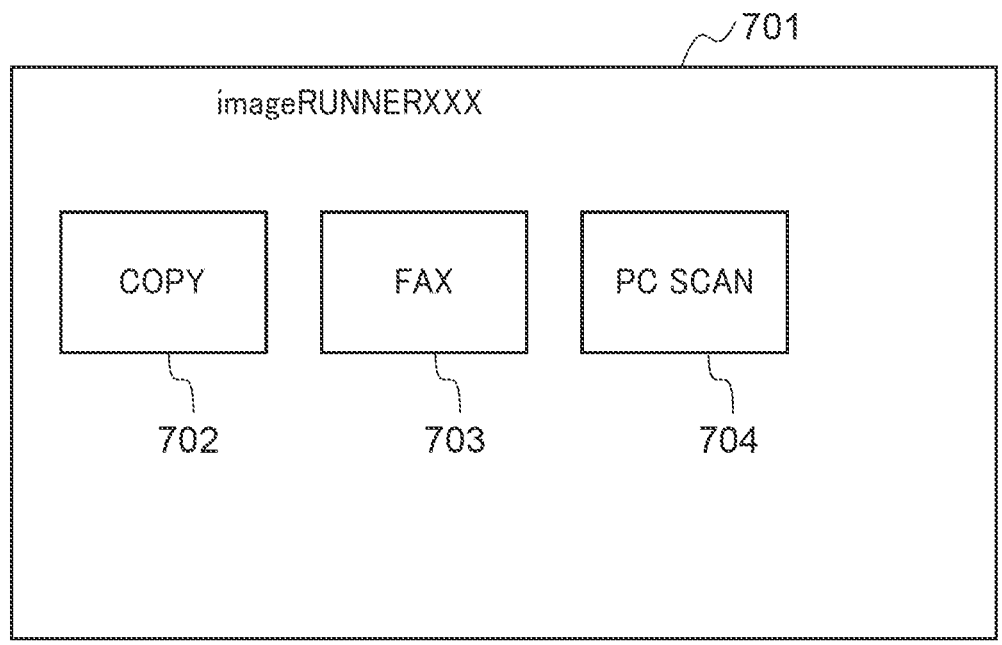
FIGS. 9A to 9D are diagrams each showing an example of a screen displayed on a display section of the image processing apparatus.
Figure 9B:
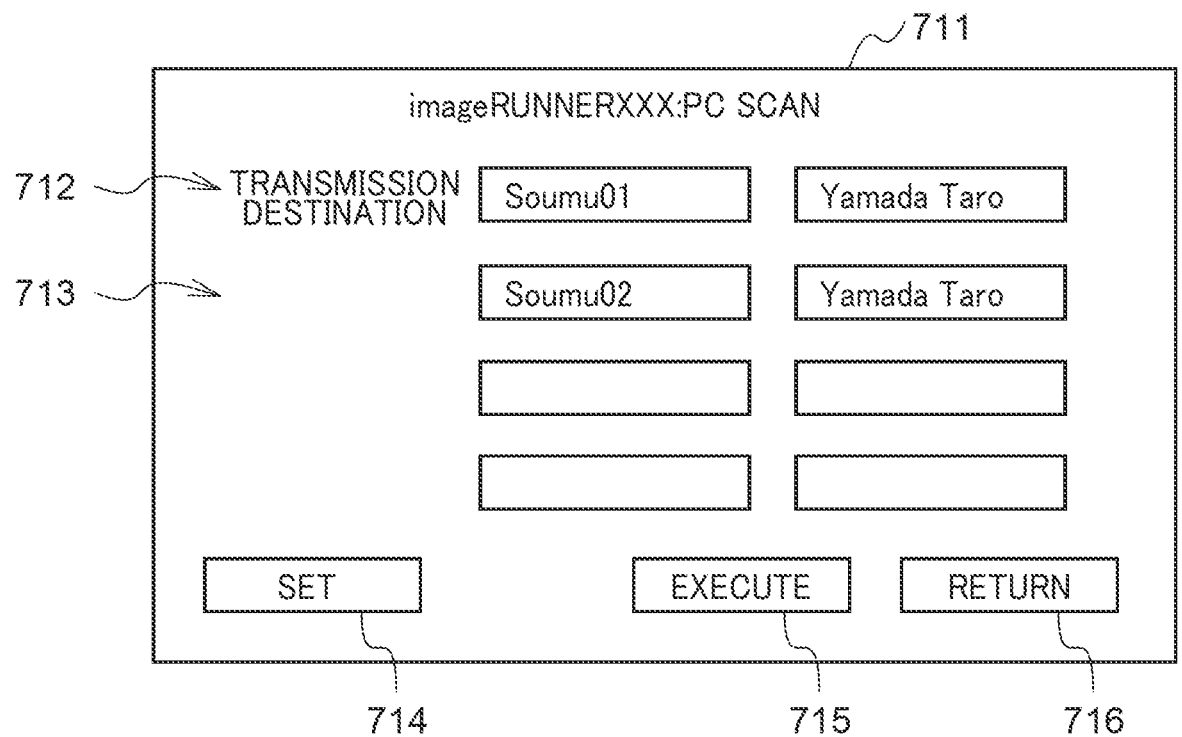
Figure 9C:
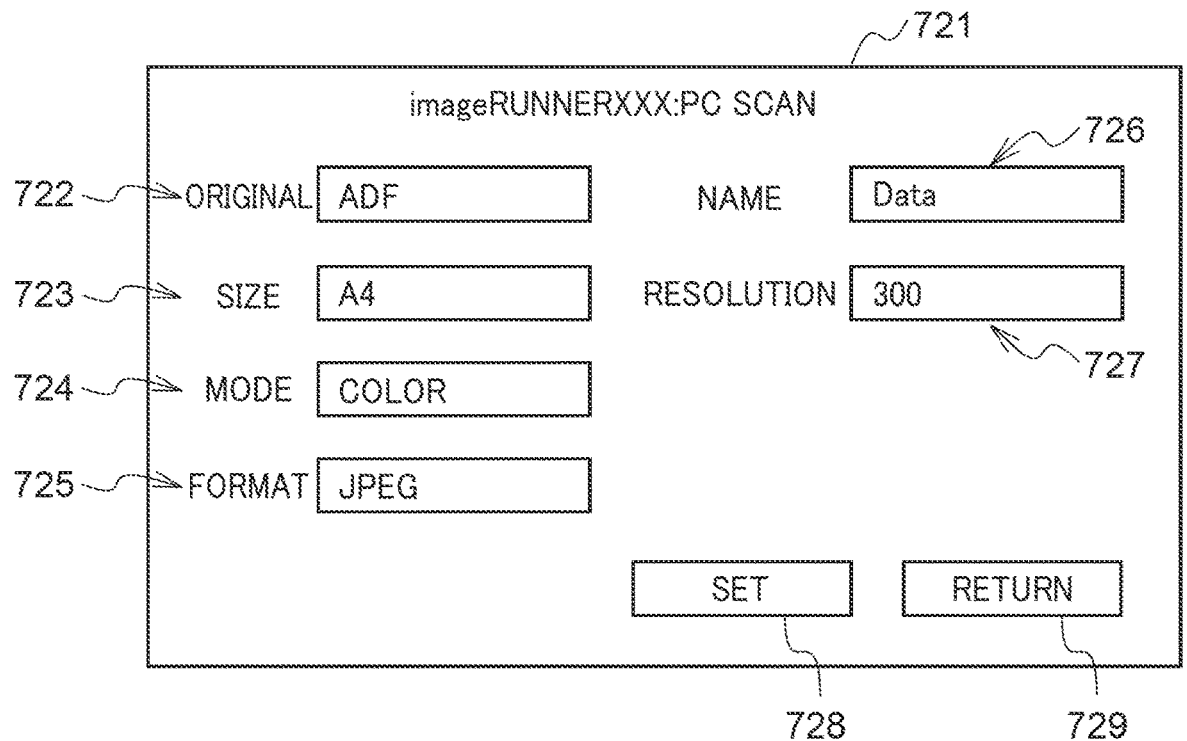
Figure 9D:
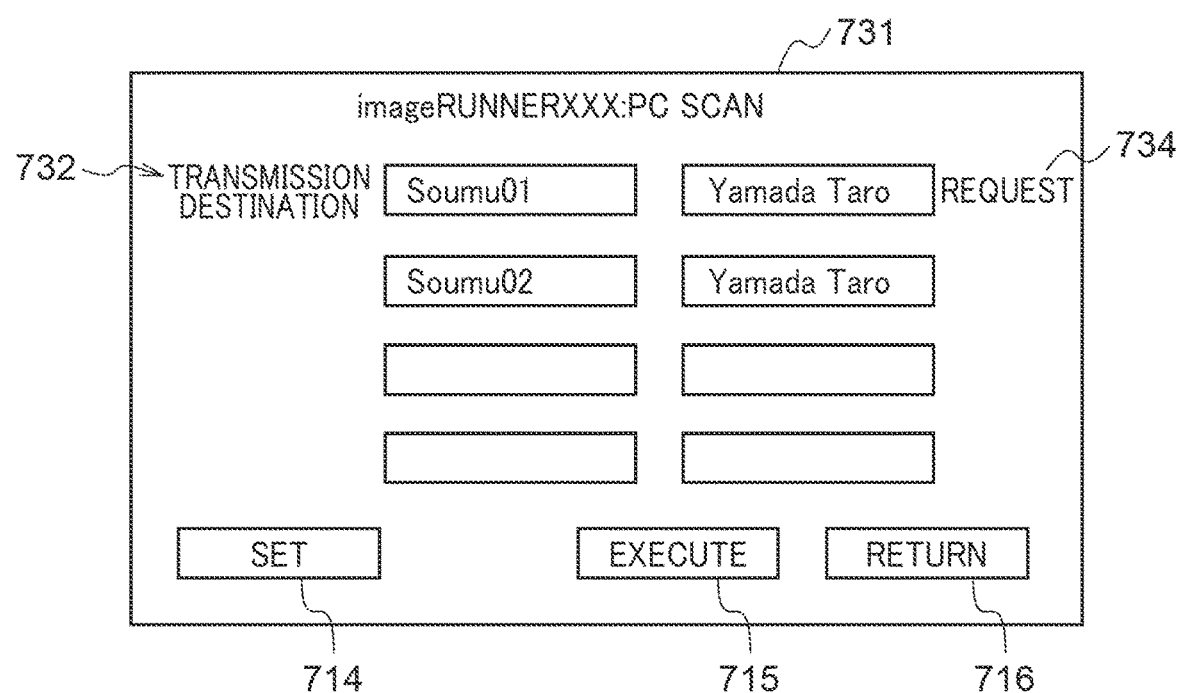

When a "set" button 714 is pressed, a screen 721 shown in FIG. 9C by way of example is displayed on the display section 313. On the screen 721, a variety of attributes of an image to be held can be changed and set. An original 722 is an item for selecting a component or part from which the image to be held is read, such as an original platen glass or an ADF (Auto Document Feeder), can be selected. A size 723 is an item for selecting a size of the image to be held. A mode 724 is an item for selecting color/monochrome/gray scale of the image to be held. A format 725 is an item for selecting a file storage format of the image to be held, such as PDF or JPEG.

A name 726 is an item for setting a leading portion of a file name of the image to be held. For example, in a case where three original sheets are read from the ADF as "Data", file names, such as "Data001/Data002/Data003", are each generated by adding a number to the leading portion while automatically incrementing the number. A resolution 727 is an item for selecting an optical resolution of the image to be held, and the optical resolution depends on the performance of the reading section 316. Here, as the optical resolution, "150 dpi/300 dpi/600 dpi" or the like can be selected.

When a "set" button 728 is pressed, the changed contents are finally determined, and the screen returns to the screen 711 (see FIG. 9B). On the other hand, when a "return" button 729 is pressed, the changed contents are discarded, and the screen returns to the screen 711.

When an "execute" button 715 is pressed on the screen 711, an original set on the reading section 316 of the image processing apparatus 105 at the time point is read. Then, the read image is stored in an area allocated to the external storage device 312, for the ID selected on the screen 711 (selected from the item rows 712 and 713). When a "return" 716 is pressed on this screen, the screen returns to a screen 701 (see FIG. 9A) as the previous screen without reading the original.

The screen 701 is an example of a basic screen displayed after the startup of the image processing apparatus 105. In a case where a "copy" button 702 is pressed on this screen, copy processing is performed, and in a case where a "FAX" button 703 is pressed, FAX processing is performed. In a case where a "PC scan" button 704 is pressed, the screen shifts to the screen 711 in FIG. 9B, and a held image can be stored.

In FIG. 14A, candidate selection and image holding processing 1207 corresponds to the steps S422 and S423 (see FIG. 13C). Here, when the ID of the item row 712 or the item row 713 is selected and the "execute" button 715 is pressed, the original is scanned, and a held image 1208 which has been scanned is held in the external storage device 312.

Figure 10A:
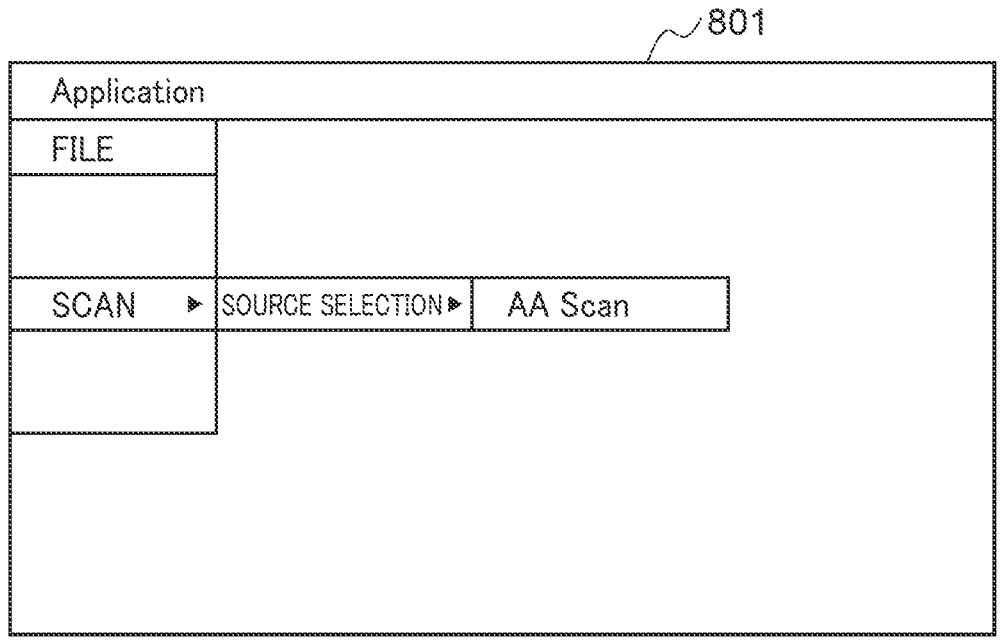
FIGS. 10A to 10D are diagrams each showing an example of a screen displayed on the display section of the information processing apparatus.
Figure 10B:
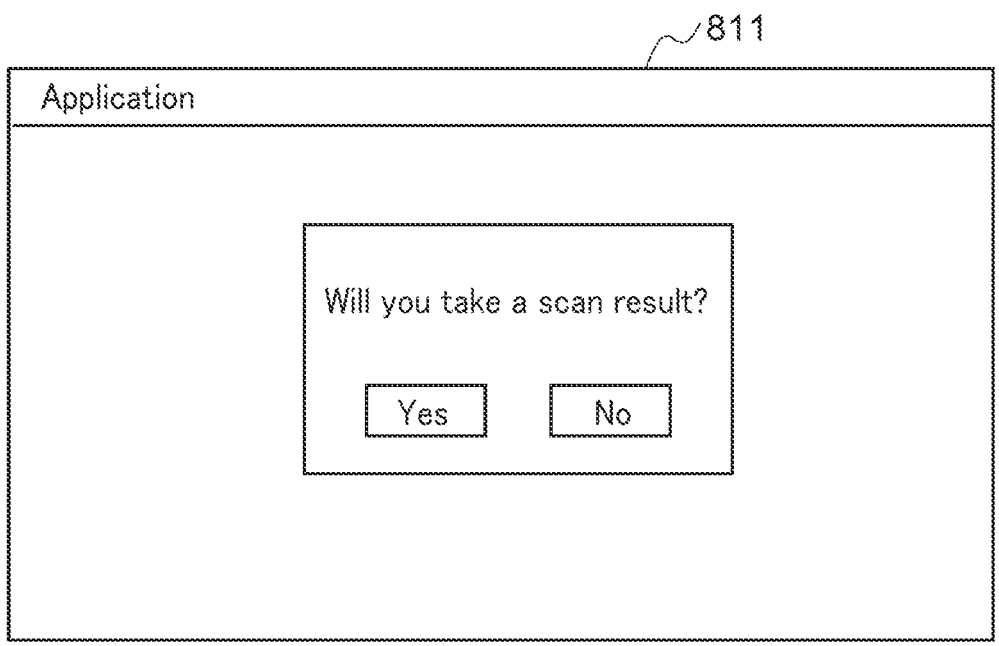
Figure 10C:
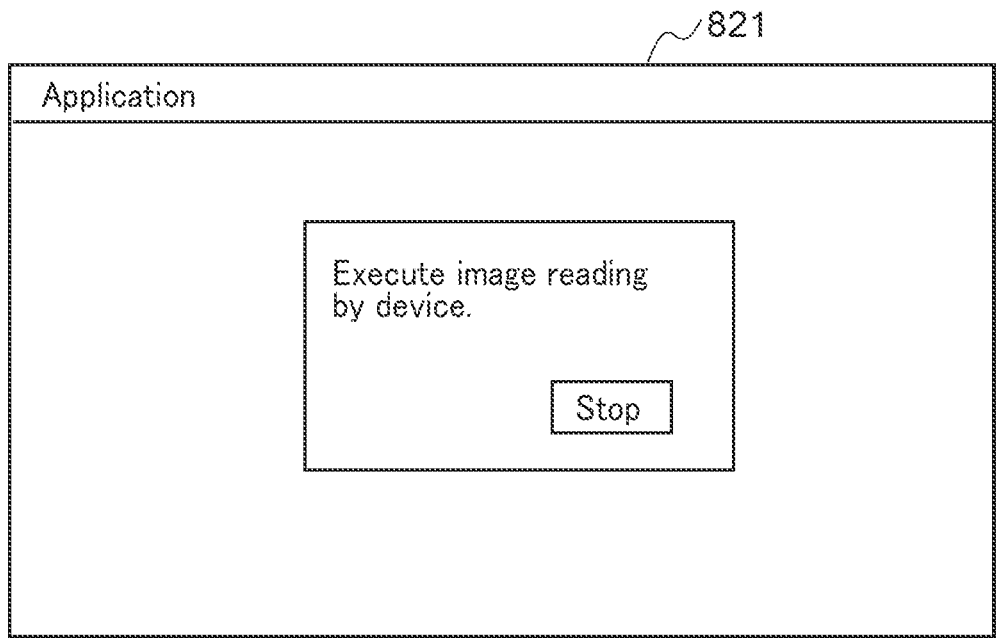
Figure 10D:
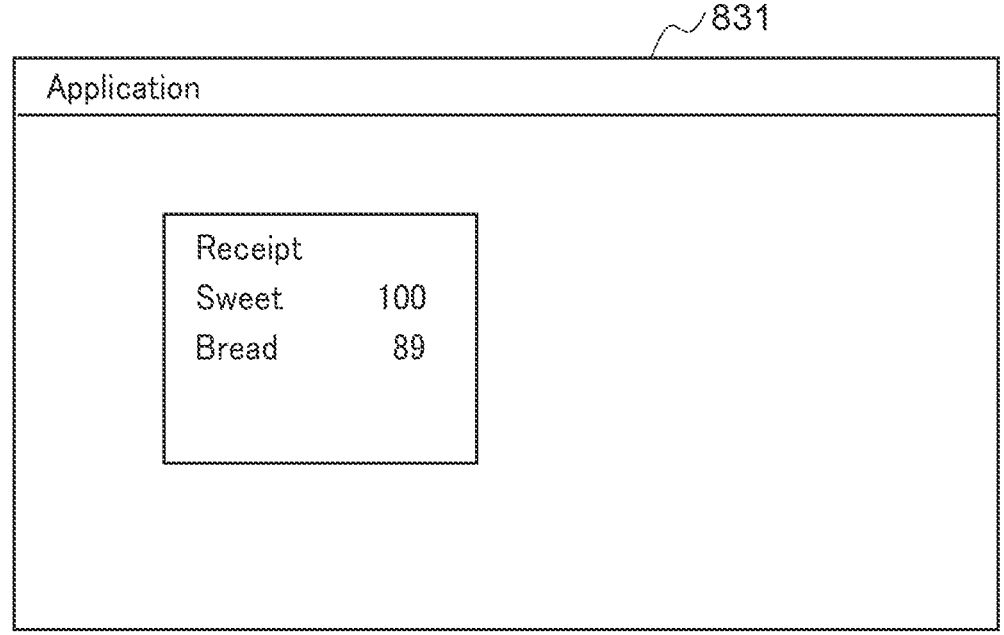

Scan result transmission instruction processing 1202 corresponds to the step S204 (see FIG. 7B). That is, a transmission instruction for a result of hold scan (image transmission request) is issued and transmitted to the image processing apparatus 105. More specifically, these processing operations are performed as follows: First, when the application process (see FIG. 6C) is started, an application screen 801 shown in FIG. 10A is displayed on the display section 211. When scan, source selection, and AAScan are sequentially selected from a file menu on the application screen 801, the scanner driver process (see FIG. 7B) is started, and a driver screen 811 shown in FIG. 10B is displayed on the display section 211. After "Yes" is selected on the driver screen 811, a transmission instruction for a result of hold scan (image transmission request) is issued (step S204). In response to this transmission instruction, in the image processing apparatus 105, the transmission instruction responding process (step S305 and in FIG. 13A) is executed.

Held image transmission processing 1209 shown in FIG. 14A corresponds to the step S403 (see FIG. 13A). That is, in the case 1, since the held image has been accumulated in advance, the answer to the question of the step S401 (see FIG. 13A) is affirmative "YES", so that the step S403 is executed. Scan result reception (application) processing 1203 corresponds to the step S206 (see FIG. 7B). That is, when the held image is transmitted from the image processing apparatus 105, it is determined in the step S205 that the data has been received, so that the step S206 is executed. Scan result display processing 1204 corresponds to the step S207 (see FIG. 7B). The result of hold scan is displayed on a screen 831 shown in FIG. 10D by way of example.

Thus, in the case 1 in which a held image transmission request is issued after a held image has been accumulated in the image processing apparatus 105, the held image can be taken in by the application started in the information processing apparatus 104.

Next, the case 2 (see FIG. 14B) will be described. ID (PC name and user name) transmission processing 1211 is the same processing as the ID (PC name and user name) transmission processing 1201 of the case 1. Scan result transmission instruction processing 1212 is the same processing as the scan result transmission instruction processing 1202 of the case 1.

When a transmission instruction for a result of hold scan (image transmission request) is issued and transmitted by the scan result transmission instruction processing 1212 (step S204), in response to the transmission instruction, the transmission instruction responding process (step S305 and FIG. 13A) is executed in the image processing apparatus 105. In the case 2, since no held image has been accumulated in advance, the answer to the question of the step S401 (see FIG. 13A) is negative "NO", and the step S402 is executed. Therefore, the image accumulation-monitoring process (see FIG. 13B) is started. Image accumulation monitoring start processing 1218 corresponds to the start of the image accumulation-monitoring process (see FIG. 13B), whereby image accumulation monitoring processing 1220 is started.

In the case 2, since no held image has been held (accumulated) in the external storage device 312 at this time point, NoData response processing 1219 is executed to notify the information processing apparatus 104 of this fact. The NoData response processing 1219 corresponds to the step S411 (see FIG. 13B). Upon receipt of the NoData in the step S205 (see FIG. 7B), the information processing apparatus 104 prompts the user to perform image reading via the UI (step S208 in FIG. 7B). Image reading request display 1213 corresponds to the step S208.

Job reception process start processing 1214 corresponds to the step S210 (see FIG. 7B). That is, the job reception process (see FIG. 7A) operating in the background is started. The step S201 is repeated until held image data is received from the image processing apparatus 105 at predetermined time intervals. Therefore, this process loops in the background until held image data is received, which affects the power consumption in the information processing apparatus 104. A job reception process 1221 corresponds to the loop of the step S201.

Login processing 1222 corresponds to the step S302 (see FIG. 12), and the login processing using a user name is simply performed with respect to the image processing apparatus 105. Here, an example is described wherein the user has logged in the image processing apparatus 105 using the user name "Yamada Taro". Processing 1223 for displaying an ID associated with a user name as an image-holding candidate is the same as the processing 1206. However, in this case 2, the information indicating the ID of the received held image transmission request has already been received and the determination in the step S401 has already been performed. Therefore, as displayed on a screen 731 shown in FIG. 9D by way of example, the screen may be configured such that an ID requesting an image can be determined at a glance using a display, such as a notification display 734, appearing beside an associated image-holding candidate.

When the "execute" button 715 is pressed on the screen 731 after selecting an item row 732, the original set on the reading section 316 of the image processing apparatus 105 at the time point is read, i.e. scanned. Then, the image is stored in an area allocated to the external storage device 312, for the ID (item 732) selected on the screen 731. Candidate selection and image holding processing 1224 indicates this process.

The answer to the question of the step S412 (see FIG. 13B) is negative (NO) until a held image is accumulated in the external storage device 312. When the held image 1225 is accumulated, the answer to the question of the step S412 is affirmative (YES), so that the process proceeds to the step S413. Held image transmission processing 1226 corresponds to the step S413 in FIG. 13B, and the accumulated held image 1225 is transmitted to the information processing apparatus 104.

When the held image is transmitted from the image processing apparatus 105, the job reception process 435 receives all transmitted image data until no image data is left (the steps S201 and S202 in FIG. 7A). Scan result reception (job reception process) processing 1215 and reception processing 1227 correspond to this process. Scan result reception (application) processing 1216 corresponds to the step S203 (see FIG. 7A), and the received image is provided to the scanner driver 416. Scan result display processing 1217 corresponds to the step S207 (see FIG. 7B), a result of hold scan is displayed on the screen 831 (see FIG. 10D), and the background process of the job reception process is terminated.

As described above, in the case 2, even in a case where the held image transmission request is issued from the information processing apparatus 104 before an image is held in the image processing apparatus 105, it is possible to take in the image by operating the background process in the information processing apparatus 104. Also in this case, the minimum necessary operation is required for the background process, and hence the power consumption is small.

According to the present embodiment, the scanner driver 416 as transmission means transmits an image transmission request to the image processing apparatus 105 (step S204). The job reception process base section 436 as the monitoring means monitors whether or not an image associated with the transmission request has been received from the image processing apparatus 105 (see FIG. 7A). When NoData has been received as a response to the transmission request, the scanner driver 416 as controlling means controls the job reception process base section 436 to start the above-mentioned monitoring (job reception process) (step S210). In a case where an image associated with the transmission request has been received from the image processing apparatus 105 as a response to the transmission request, the scanner driver 416 does not cause the job reception process base section 436 to start the above-mentioned monitoring (job reception process) (steps S205 to S206).

The amount of electric power consumed by the job reception process is large. However, it is not necessary to always operate this process, and this process is operated in the background only in a situation where when a held image transmission request is issued, an image associated with this request has not been held in the image processing apparatus 105. Specifically, the case 2 in which a held image transmission request is issued from the information processing apparatus 104 before an image is held in the image processing apparatus 105 corresponds to the situation. Also in this case 2, the image associated with the transmission request can be received. Therefore, it is possible to receive an image associated with a transmission request issued before image accumulation while suppressing power consumption.

On the other hand, in a case where an image associated with the transmission request has been received from the image processing apparatus 105 as a response to the transmission request, all of the transmitted image data is received (step S206). For example, as in the case 1 in which a held image transmission request is issued after a held image is accumulated in the image processing apparatus 105, it is possible to receive the held image. Therefore, it is possible to receive an image associated with a transmission request issued after accumulating the image.

Further, the scanner driver 416 causes the job reception process base section 436 to start monitoring (job reception process), and then terminates the monitoring when all image data associated with the transmission request has been received (see FIG. 7A). Therefore, it is possible to avoid unnecessary continuation of the operation of the job reception process and thereby suppress power consumption.

Further, the received image is displayed on the display section 211 (step S207). Further, when NoData as the information indicating that there is no image associated with the transmission request is received, this fact is notified to the user (step S208). With these operations, it is possible to provide an appropriate notification to the user.

Further, in the present embodiment, an ID which is information on the requesting source of an image is added to the transmission request (step S204). Then, the image processing apparatus 105 identifies an image associated with the transmission request based on the requesting source information (ID) added to the transmission request (step S421 and FIG. 9B). Therefore, it is possible to manage information on a plurality of information processing apparatuses 104, and hence held images managed in the image processing apparatus 105 have high user convenience. However, such configuration is not necessarily required, and from the viewpoint of simplifying the configuration, the process associated with the ID formed by a PC name and a user name may be excluded as in a variation described hereafter.

In the variation, the steps S101 and S102 in FIG. 6A, and the process shown in FIG. 6B are eliminated, and the steps S302 and S303 in FIG. 12, and the steps S412 and S413 in FIG. 13B are eliminated. An operation in a case where these processing operations are eliminated will be described focusing on a difference from a case where these processing operations are not eliminated.

The processing operations eliminated in the variation are processing operations associated with the ID formed by a PC name and a user name. In the variation, it is assumed that the information processing apparatus 104 and the image processing apparatus 105 are operated, with the PC name and the user name fixed to unique values, such as AnyPC and AnyUser.

Since the PC name and the user name are fixed to the unique values, held images of a plurality of PCs and a plurality of users are not managed at the same time. The held images managed by the image processing apparatus 105 are only images associated with the PC name of AnyPC and the user name of AnyUser.

In the step S401 in FIG. 13A, the transmission instruction-responding section 533 determines whether or not a held image as a result of hold scan associated with an ID transmitted from the information processing apparatus 104 exists (is accumulated) in the external storage device 312 of the image processing apparatus 105. In this step, existence of a held scan as a result of hold scan associated with the ID fixed to the unique values, such as AnyPC and AnyUser, is checked.

In the step S402, the image accumulation-monitoring process (see FIG. 13B) is started. However, in the variation, the image accumulation-monitoring process (see FIG. 13B) is formed only by the step S411, and hence no actual monitoring of image accumulation is performed.

However, after NoData has been transmitted as a response in the step S411, the accumulation monitoring process 541 sets a NoData issuance completion flag held in the area allocated to the external storage device 312, for the ID fixed to the unique values, to ON.

In the step S403, the data transmission section 534 transmits the held image as the result of hold scan associated with the ID to the information processing apparatus 104.

In the step S421 in FIG. 13C, the scan control base section 532 displays the unique ID, such as AnyPC and AnyUser, on the image processing apparatus UI controller 515 of the image processing apparatus 105. With this, it is possible to store a held image as a result of hold scan associated with the ID.

If it is determined in the step S422 that image reading has been performed, the scan control base section 532 proceeds to the step S423. In the step S423, the scan control base section 532 stores the held image as the result of hold scan associated with the unique ID, such as AnyPC and AnyUser, in the external storage device 312.

After that, the scan control base section 532 checks the NoData issuance completion flag in the external storage device 312, and if the NoData issuance completion flag is ON, the scan control base section 532 transmits the held image as the result of hold scan associated with the unique ID to the information processing apparatus 104.

Also in this variation, as indicated in the case 2 in which a held image transmission request is issued from the information processing apparatus 104 before a held image is accumulated in the image processing apparatus 105, it is possible to receive the held image associated with the transmission request. Further, as in the case 1 in which a held image transmission request is issued after a held image has been accumulated in the image processing apparatus 105, it is possible to receive the held image. Therefore, it is possible to obtain the advantageous effects that reception of an image associated with a transmission request issued before image accumulation is enabled while suppressing power consumption.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-138071, filed Aug. 26, 2021, which is hereby incorporated by reference herein in its entirety.

What is claimed is:

1. An information processing apparatus comprising:
a memory storing instructions; and
at least one processor that executes the instructions to:
transmit a transmission request for transmitting an image to an image processing apparatus;
receive an image to be transmitted as the response to the transmission request or no-image information indicating that no image to be transmitted as the response to the transmission request is stored in the image processing apparatus; and
start, in response to receiving the no-image information, a monitoring process of monitoring whether or not the image to be transmitted as the response to the transmission request has been received, the image being received without retransmission of the transmission request, the monitoring process being not performed before the no-image information is received.

2. The information processing apparatus according to claim 1, wherein in a state where the image to be transmitted as the response to the transmission request has been received as the response to the transmission request while the monitoring process has started, the at least one processor executes the instructions to terminate the monitoring process.

3. The information processing apparatus according to claim 2, wherein the at least one processor executes the instructions to control a display device to display the received image.

4. The information processing apparatus according to claim 1, wherein in a state where the at least one processor, while the monitoring process has started, determines that the image to be transmitted as the response to the transmission request has been received, the at least one processor executes the instructions to receive an additional image to be transmitted as the response to the transmission request.

5. The information processing apparatus according to claim 4, wherein in a state where all images to be transmitted as the response to the transmission request have been received while the monitoring process has started, the at least one processor executes the instructions to terminate the monitoring process.

6. The information processing apparatus according to claim 1, wherein in a state where the no-image information has been received, the at least one processor executes the instructions to output a notice that the no-image information has been received.

7. The information processing apparatus according to claim 1, wherein the image is a scanned image.

8. An image processing system comprising:
an image processing apparatus;
an information processing apparatus communicable with the image processing apparatus, and comprising:
a memory storing instructions; and
at least one processor that executes the instructions to:

transmit a transmission request for transmitting an image to the image processing apparatus;

receive an image to be transmitted as the response to the transmission request or no-image information indicating that no image to be transmitted as the response to the transmission request is stored in the image processing apparatus; and start, in response to receiving the no-image information, a monitoring process of monitoring whether or not the image to be transmitted as the response to the transmission request has been received, the image being received without retransmission of the transmission request, the monitoring process being not performed before the no-image information is received, wherein the image processing apparatus transmits, in a state where no image to be transmitted as the response to the transmission request is stored in the image processing apparatus, the image processing apparatus transmits the no-image information.

9. The image processing system according to claim 8, wherein after transmitting the no-image information to the information processing apparatus, the image processing apparatus starts accumulating the image to be transmitted as the response to the transmission request, and transmits, after the image has been accumulated, the accumulated image to the information processing apparatus.

10. The image processing system according to claim 8, wherein in a state where the image to be transmitted as the response to the transmission request is stored in the image processing apparatus, the image processing apparatus transmits the image to be transmitted as the response to the transmission request to the information processing apparatus.

11. The image processing system according to claim 8, wherein:

the transmission request includes information on a requesting source of the image to be transmitted as the response to the transmission request, and the image processing apparatus identifies the image to be transmitted as the response to the transmission request based on the information on the requesting source.

12. A method of controlling an information processing apparatus, comprising:

transmitting a transmission request for transmitting an image to an image processing apparatus;

receiving an image to be transmitted as the response to the transmission request or no-image information indicating that no image to be transmitted as the response to the transmission request is stored in the image processing apparatus; and starting, in response to receiving the no-image information, a monitoring process of monitoring whether or not the image to be transmitted as the response to the transmission request has been received, the image being received without retransmission of the transmission request, the monitoring process being not performed before the no-image information is received.

13. A non-transitory computer-readable storage medium storing a program executable by a computer to execute a method of controlling an information processing apparatus, the method comprising:

transmitting a transmission request for transmitting an image to an image processing apparatus;

receiving an image to be transmitted as the response to the transmission request or no-image information indicating that no image to be transmitted as the response to the transmission request is stored in the image processing apparatus; and starting, in response to receiving the no-image information, a monitoring process of monitoring whether or not the image to be transmitted as the response to the transmission request has been received, the image being received without retransmission of the transmission request, the monitoring process being not performed before the no-image information is received.

* * * * *